(12) United States Patent
Perlman et al.

(10) Patent No.: US 8,508,673 B2
(45) Date of Patent: Aug. 13, 2013

(54) USER INTERFACE DEVICE AND METHOD FOR PRESENTING VIEWING CONTENT

(75) Inventors: Marshal H. Perlman, Portola Hills, CA (US); Darryl C. Galvan, La Jolla, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 1268 days.

(21) Appl. No.: 11/835,371

(22) Filed: Aug. 7, 2007

(65) Prior Publication Data

US 2008/0040756 A1 Feb. 14, 2008

Related U.S. Application Data

(60) Provisional application No. 60/836,535, filed on Aug. 8, 2006.

(51) Int. Cl.
*H04N 5/64* (2006.01)

(52) U.S. Cl.
USPC .............................. 348/837; 348/839; 725/77

(58) Field of Classification Search
USPC ........... 348/835, 836, 837, 838, 839; 725/75, 725/76, 77; 312/7.2
See application file for complete search history.

(56) References Cited

U.S. PATENT DOCUMENTS

| | | | |
|---|---|---|---|
| 3,037,812 A | 6/1962 | Monroe | |
| 4,897,714 A | 1/1990 | Ichise et al. | |
| 5,009,384 A | 4/1991 | Gerke et al. | |
| 5,144,290 A | 9/1992 | Honda et al. | |
| 5,469,363 A | 11/1995 | Saliga | |
| 5,640,002 A | 6/1997 | Ruppert et al. | |
| 5,701,582 A | 12/1997 | DeBey | |
| 5,709,448 A | 1/1998 | Jennings et al. | |
| 5,760,819 A | 6/1998 | Sklar et al. | |
| 5,790,175 A | 8/1998 | Sklar et al. | |
| 5,835,127 A | 11/1998 | Booth et al. | |

(Continued)

FOREIGN PATENT DOCUMENTS

| | | |
|---|---|---|
| EP | 1078852 | 2/2001 |
| EP | 1458590 | 6/2005 |

(Continued)

OTHER PUBLICATIONS

US, Office Action, U.S. Appl. No. 09/952,629, Mar. 14, 2006.

(Continued)

*Primary Examiner* — William Gilbert
*Assistant Examiner* — James Ference
(74) *Attorney, Agent, or Firm* — Orrick, Herrington & Sutcliffe LLP

(57) ABSTRACT

A user interface device for presenting selected viewing content and methods for manufacturing and using same. The user interface device is adapted for installation at a suitable location via any of a wide variety of conventional mounting systems. The user interface device thereby can select and present viewing content and, when not in use, can be stowed in a manner that does not interfere with the user. A malfunctioning user interface device can be easily removed from the mounting system and replaced with another user interface device, minimizing inconvenience to the user and facilitating repairs. Since the user interface devices are produced with a common docking interface system, each user interface device can, without modification, be engaged by any other mounting system. Thereby, only one version of the user interface device needs to be produced, purchased, and inventoried.

29 Claims, 13 Drawing Sheets

(56) References Cited

U.S. PATENT DOCUMENTS

| | | | |
|---|---|---|---|
| 5,889,268 A | 3/1999 | Swartz |
| 5,889,775 A | 3/1999 | Sawicz et al. |
| 5,953,429 A | 9/1999 | Wakai et al. |
| 5,959,596 A | 9/1999 | McCarten et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,058,288 A | 5/2000 | Reed et al. |
| 6,129,274 A | 10/2000 | Suzuki |
| 6,135,549 A | 10/2000 | Demick et al. |
| 6,177,887 B1 | 1/2001 | Jerome |
| 6,201,797 B1 | 3/2001 | Leuca et al. |
| 6,208,307 B1 | 3/2001 | Frisco et al. |
| 6,249,913 B1 | 6/2001 | Galipeau et al. |
| 6,338,045 B1 | 1/2002 | Pappas |
| 6,487,540 B1 | 11/2002 | Smith et al. |
| 6,507,279 B2 | 1/2003 | Loof |
| 6,507,952 B1 | 1/2003 | Miller et al. |
| 6,519,693 B1 | 2/2003 | Debey |
| 6,549,754 B1 | 4/2003 | Miller et al. |
| 6,574,338 B1 | 6/2003 | Sachdev |
| 6,600,418 B2 | 7/2003 | Franics et al. |
| 6,609,103 B1 | 8/2003 | Kolls |
| 6,622,124 B1 | 9/2003 | Kolls |
| 6,637,484 B1 | 10/2003 | Kraft |
| 6,643,510 B2 | 11/2003 | Taylor |
| 6,693,236 B1 | 2/2004 | Gould et al. |
| 6,702,604 B1 | 3/2004 | Moscovitch |
| 6,736,315 B2 | 5/2004 | Swartz |
| 6,757,712 B1 | 6/2004 | Bastian et al. |
| 6,796,495 B2 | 9/2004 | Stahl et al. |
| 6,876,905 B2 | 4/2005 | Farley et al. |
| 6,899,390 B2 | 5/2005 | Sanfrod et al. |
| 6,990,338 B2 | 1/2006 | Miller et al. |
| 7,036,889 B2 | 5/2006 | Sanfrod et al. |
| 7,100,187 B2 | 8/2006 | Pierzga et al. |
| 7,124,426 B1 | 10/2006 | Tsuria et al. |
| 7,177,638 B2 | 2/2007 | Funderburk et al. |
| 7,280,825 B2 | 10/2007 | Keen et al. |
| 7,360,833 B2* | 4/2008 | Vitito | 297/217.3 |
| 7,448,679 B2* | 11/2008 | Chang | 297/217.3 |
| 7,454,203 B2 | 11/2008 | Levitan |
| 7,483,696 B1 | 1/2009 | Mitchell |
| 7,496,361 B1 | 2/2009 | Mitchell et al. |
| 7,591,508 B2* | 9/2009 | Chang | 297/217.3 |
| 7,636,930 B2* | 12/2009 | Chang | 725/75 |
| 7,812,784 B2* | 10/2010 | Chang | 345/1.1 |
| 7,945,934 B2* | 5/2011 | Margis et al. | 725/75 |
| 2002/0059363 A1* | 5/2002 | Katz et al. | 709/203 |
| 2002/0093564 A1* | 7/2002 | Israel | 348/145 |
| 2002/0136540 A1 | 9/2002 | Adams et al. |
| 2002/0152470 A1 | 10/2002 | Hammond |
| 2002/0178451 A1 | 11/2002 | Ficco |
| 2003/0023979 A1* | 1/2003 | Emoto et al. | 725/75 |
| 2003/0107248 A1 | 6/2003 | Sanford et al. |
| 2003/0148736 A1 | 8/2003 | Wright et al. |
| 2003/0233658 A1* | 12/2003 | Keen et al. | 725/76 |
| 2004/0077308 A1 | 4/2004 | Sanford et al. |
| 2004/0078821 A1* | 4/2004 | Frisco et al. | 725/76 |
| 2004/0098745 A1 | 5/2004 | Marston et al. |
| 2004/0167967 A1 | 8/2004 | Bastian et al. |
| 2004/0183346 A1 | 9/2004 | Sanford et al. |
| 2004/0237111 A1* | 11/2004 | Iraclianos et al. | 725/75 |
| 2005/0044564 A1 | 2/2005 | Stopniewicz |
| 2005/0047081 A1* | 3/2005 | LaPorte et al. | 361/686 |
| 2005/0055725 A1* | 3/2005 | Stewart | 725/92 |
| 2005/0111182 A1* | 5/2005 | Lin et al. | 361/686 |
| 2005/0132407 A1* | 6/2005 | Boyer et al. | 725/77 |
| 2005/0202785 A1 | 9/2005 | Meyer |
| 2005/0216938 A1 | 9/2005 | Brady et al. |
| 2005/0223406 A1* | 10/2005 | Vitito | 725/77 |
| 2005/0235326 A1 | 10/2005 | Vitito | 725/77 |
| 2005/0235327 A1* | 10/2005 | Vitito | 725/77 |
| 2005/0242636 A1* | 11/2005 | Vitito | 297/217.3 |
| 2005/0242637 A1* | 11/2005 | Vitito | 297/217.3 |
| 2005/0242638 A1* | 11/2005 | Vitito | 297/217.3 |
| 2005/0268319 A1* | 12/2005 | Brady | 725/76 |
| 2005/0278753 A1* | 12/2005 | Brady et al. | 725/76 |
| 2006/0032979 A1 | 2/2006 | Mitchell et al. |
| 2006/0047426 A1* | 3/2006 | Vitito | 701/213 |
| 2006/0070102 A1* | 3/2006 | Vitito | 725/77 |
| 2006/0070103 A1* | 3/2006 | Vitito | 725/77 |
| 2006/0088001 A1 | 4/2006 | Reitmann et al. |
| 2006/0107295 A1* | 5/2006 | Margis et al. | 725/81 |
| 2006/0119151 A1* | 6/2006 | Vitito | 297/217.3 |
| 2006/0128303 A1 | 6/2006 | Schedivy |
| 2006/0174285 A1 | 8/2006 | Brady, Jr. et al. |
| 2006/0212909 A1* | 9/2006 | Girard et al. | 725/73 |
| 2006/0217121 A1 | 9/2006 | Soliman et al. |
| 2006/0234102 A1 | 10/2006 | Funderburk et al. |
| 2006/0270373 A1 | 11/2006 | So |
| 2006/0271967 A1* | 11/2006 | So | 725/76 |
| 2006/0271970 A1* | 11/2006 | Mitchell et al. | 725/82 |
| 2006/0288376 A1* | 12/2006 | Vitito | 725/75 |
| 2006/0288378 A1* | 12/2006 | Vitito | 725/77 |
| 2006/0288379 A1* | 12/2006 | Vitito | 725/77 |
| 2006/0288380 A1* | 12/2006 | Vitito | 725/77 |
| 2006/0288383 A1* | 12/2006 | Vitito | 725/77 |
| 2007/0044126 A1 | 2/2007 | Mitchell |
| 2008/0124054 A1 | 5/2008 | Bonar |
| 2008/0127278 A1 | 5/2008 | Bonar |
| 2009/0007193 A1 | 1/2009 | Correa et al. |
| 2009/0042651 A1 | 2/2009 | Prabhu et al. |

FOREIGN PATENT DOCUMENTS

| | | |
|---|---|---|
| JP | 58-46485 | 3/1983 |
| JP | 62-238693 | 10/1987 |
| WO | WO 03/032503 A2 | 4/2003 |
| WO | WO 03/050000 A1 | 6/2003 |
| WO | WO 2004/003696 A2 | 1/2004 |
| WO | WO 2004/008277 A2 | 1/2004 |
| WO | WO 2006/062641 A2 | 6/2006 |
| WO | WO 2006/065381 A2 | 6/2006 |

OTHER PUBLICATIONS

US, Office Action, U.S. Appl. No. 09/952,629, Dec. 1, 2006.
US, Office Action, U.S. Appl. No. 09/952,629, Jun. 27, 2007.
US, Office Action, U.S. Appl. No. 09/952,629, Oct. 27, 2008.
US, Office Action, U.S. Appl. No. 09/952,629, Mar. 18, 2008.
US, Office Action, U.S. Appl. No. 09/952,629, Jun. 2, 2009.
US, Office Action, U.S. Appl. No. 09/811,317, Feb. 28, 2002.
US, Office Action, U.S. Appl. No. 09/811,317, Aug. 13, 2002.
US, Office Action, U.S. Appl. No. 09/811,317, Dec. 30, 2002.
US, Notice of Allowance and Fees due, U.S. Appl. No. 09/811,317, Jul. 14, 2003.
US, Office Action, U.S. Appl. No. 08/863,448, Sep. 24, 1997.
US, Office Action, U.S. Appl. No. 08/863,448, Apr. 27, 1998.
US, Notice of Allowance, U.S. Appl. No. 08/863,448, Feb. 17, 1999.
US, Office Action, U.S. Appl. No. 08/479,654, Jan. 24, 1997.
US, Office Action, U.S. Appl. No. 08/479,654, Aug. 21, 1995.
US, Office Action, U.S. Appl. No. 08/479,654, Mar. 1, 1996.
US, Office Action, U.S. Appl. No. 08/479,654, Aug. 5, 1997.
US, Office Action, U.S. Appl. No. 08/071,218, Dec. 7, 1994.
US, Office Action, U.S. Appl. No. 08/071,218, Apr. 20, 1995.
US, Notice of Allowance and Fees due, U.S. Appl. No. 08/071,218, Aug. 7, 1995.
US, Office Action, U.S. Appl. No. 08/480,666, Feb. 9, 1996.
US, Notice of Allowance and Fees due, U.S. Appl. No. 08/480,666, Sep. 5, 1996.
US, Office Action, U.S. Appl. No. 08/480,666, Oct. 16, 1996.
US, Office Action, U.S. Appl. No. 08/480,666, Nov. 22, 1996.
JP, Office Action, 2004-199893, Jul. 5, 2005.
JP, Office Action, 2006-000840, Feb. 28, 2007.
US, Office Action, U.S. Appl. No. 08/363,228, Oct. 3, 1995.
US, Office Action, U.S. Appl. No. 08/363,228, Mar. 27, 1996.
US, Notice of Allowance and Fees due, U.S. Appl. No. 08/363,228, Apr. 9, 1996.
US, Office Action, U.S. Appl. No. 10/772,565, Mar. 4, 2009.

PCT, International Search Report, PCT/US2004/017666, Apr. 2, 2005.
EP, Communication, App. No. 04754296.4-1241, Apr. 4, 2007.
AU, First Report, App No. 2004251677, Sep. 26, 2008.
US, Office Action, U.S. Appl. No. 11/123,327, Dec. 11, 2008.
PCT, International Search Report, PCT/US2005/016513, Sep. 8, 2005.
PCT, International Preliminary Report, PCT/US2005/016513, Nov. 16, 2006.
EP, Communication, App. No. 05 749 692.9-1525, Jun. 15, 2007.
EP, Communication, App. No. 05 749 692.9-1525, Oct. 22, 2008.
US, Office Action, U.S. Appl. No. 11/154,749, Aug. 18, 2008.
US, Office Action, U.S. Appl. No. 11/154,749, Jan. 23, 2009.
PCT, International Search Report, PCT/US2005/021518, Jan. 3, 2006.
PCT, International Preliminary Report, PCT/US2005/021518, Jan. 4, 2007.
EP, Communication, App. No. 05 762 201.1-2202, May 18, 2007.
EP, Communication, App. No. 05 762 201.1-2202, Jul. 18, 2008.
PCT, International Search Report, PCT/US2007/074367, Dec. 17, 2007.
Y.F. Chen, et al., "Personalized Multimedia Services Using a Mobile Service Platform", IEEE 2002, pp. 918-215.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgang Nr. Mar. 2000, pp. 100-105.
PCT, International Preliminary Report, PCT/US2007/074367, Feb. 5, 2009.
Gratschew, S., Raitaniemi, J.; Ylinen, J.; Loula, P: "A Multimedia Messaging Platform for Content Delivering," Telecommunications, 2003, ICT 2003, 10th International Conference on 'Online! vol. 1, Feb. 23, 2003, pp. 431-435.
Yih-Farn Chen; Huale Huang; Jana, R.; John, S.; Jora, S.; Reibman, A.; Bin Wei: "Personalized Multimedia Services Using a Mobile Service Platform" Wireless Communications and Networking Conference, 2002 WCNC2002. 2002 IEEE, 'Online!, vol. 2, Mar. 17, 2002, pp. 918-925.
JP, Office Action, Japense Application No. 2009-523977, Jul. 17, 2012

* cited by examiner

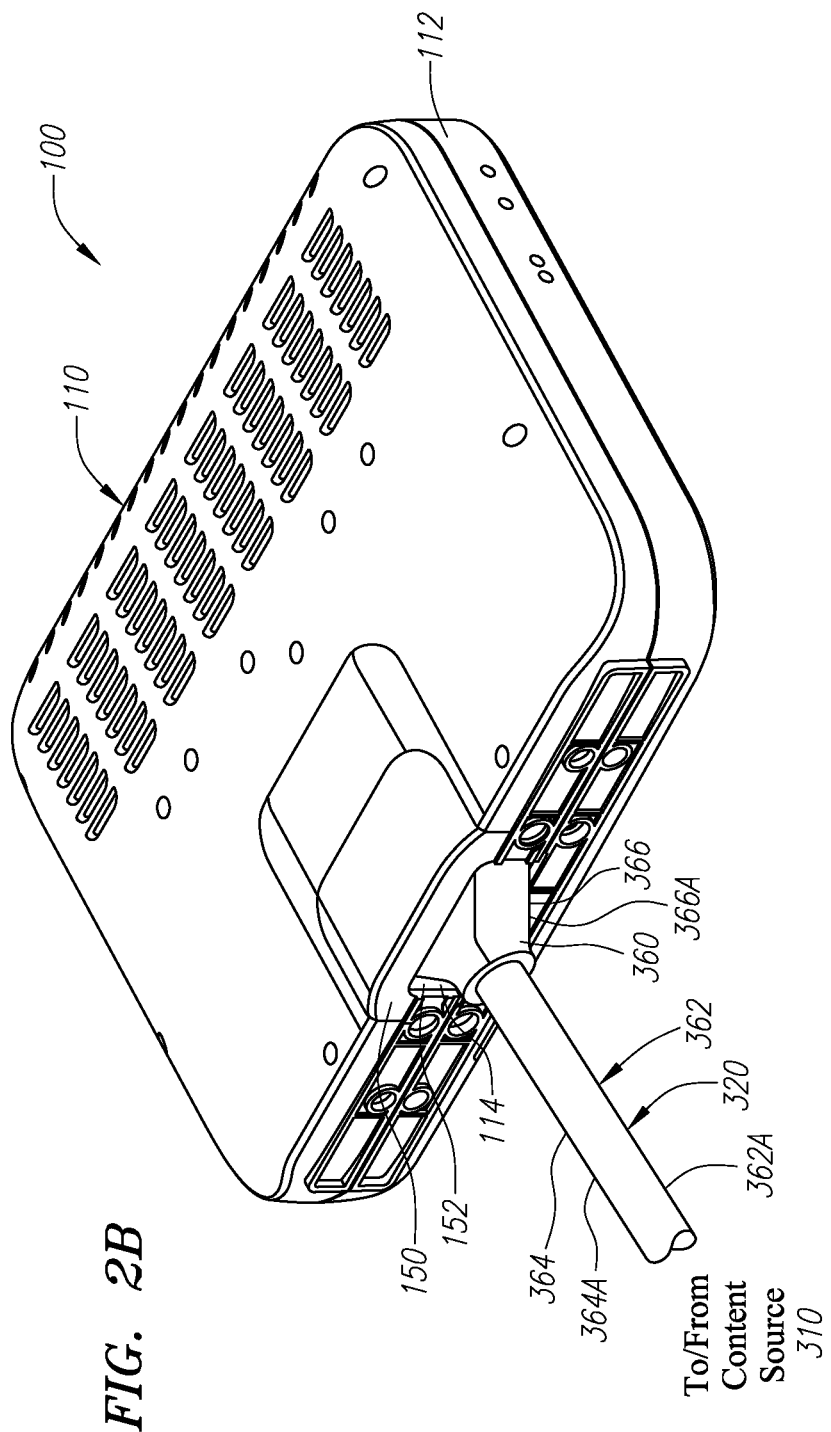

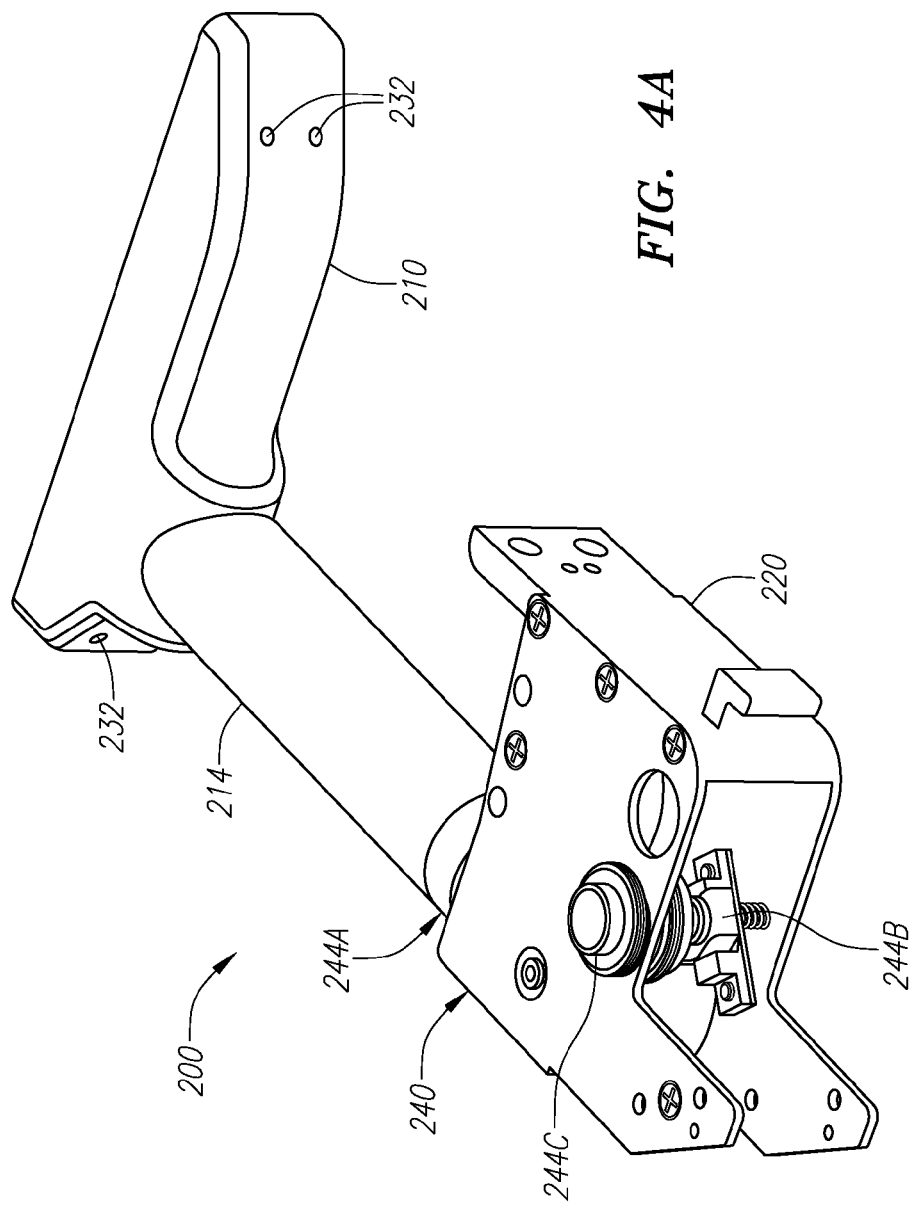

USER INTERFACE DEVICE AND METHOD FOR PRESENTING VIEWING CONTENT

CROSS-REFERENCE TO RELATED APPLICATIONS

This application claims priority to U.S. provisional patent application Ser. No. 60/836,535, filed on Aug. 8, 2006. Priority to the provisional application is expressly claimed, and the disclosure of which is hereby incorporated herein by reference in its entirety and for all purposes.

The following copending U.S. nonprovisional patent application Ser. No. 11/828,193, filed Jul. 25, 2007, is hereby incorporated by reference in its entirety and for all purposes.

FIELD

The present invention relates generally to user interface devices and more particularly, but not exclusively, to user interface devices suitable for installation aboard passenger vehicles and use with vehicle information systems.

BACKGROUND

Vehicles, such as automobiles and aircraft, often include vehicle information systems for satisfying passenger demand for access to viewing content, such as information or entertainment content, while traveling.

Conventional passenger entertainment systems typically include overhead cabin video systems or seat video systems with individual controls such that viewing content is selectable by the passengers. The viewing content can include audio and video materials that are derived from a variety of content sources. Prerecorded viewing content, such as motion pictures and music, can be provided by internal content sources, such as audio and video players, that are installed in the vehicle. The conventional passenger entertainment systems likewise can include an antenna system for receiving viewing content, such as live television programming, transmitted from one or more content providers (or sources) that are external to, and/or remote from, the vehicle.

Several mounting options can exist when the audio and video systems are disposed adjacent to a passenger seat. For example, the seat video system typically is mounted on a facing seatback or within an armrest of the passenger seat. Since the interface point for seatback video system and the interface point for in-arm video system are dissimilar, however, it is not possible to use the same seat video system for both seatback and in-arm installations. Further, the different connector requirements for seatback and in-arm installations result in each type of seat video system having a different mechanical design. Multiple versions of the seat video system therefore must be produced.

In view of the foregoing, a need exists for an improved system and method for mounting user interface devices that overcome the aforementioned obstacles and deficiencies of conventional mounting systems.

BRIEF DESCRIPTION OF THE DRAWINGS

FIG. 2B is an exemplary detail drawing illustrating the user interface device of FIG. 2A, wherein the user interface device and the content source communicate via a first selected communication cable assembly coupled with the communication port.

FIG. 4A is an exemplary detail drawing illustrating an alternative embodiment of the mounting system of FIG. 3A, wherein the mounting system is configured for installation at a seat.

Figure 1A:
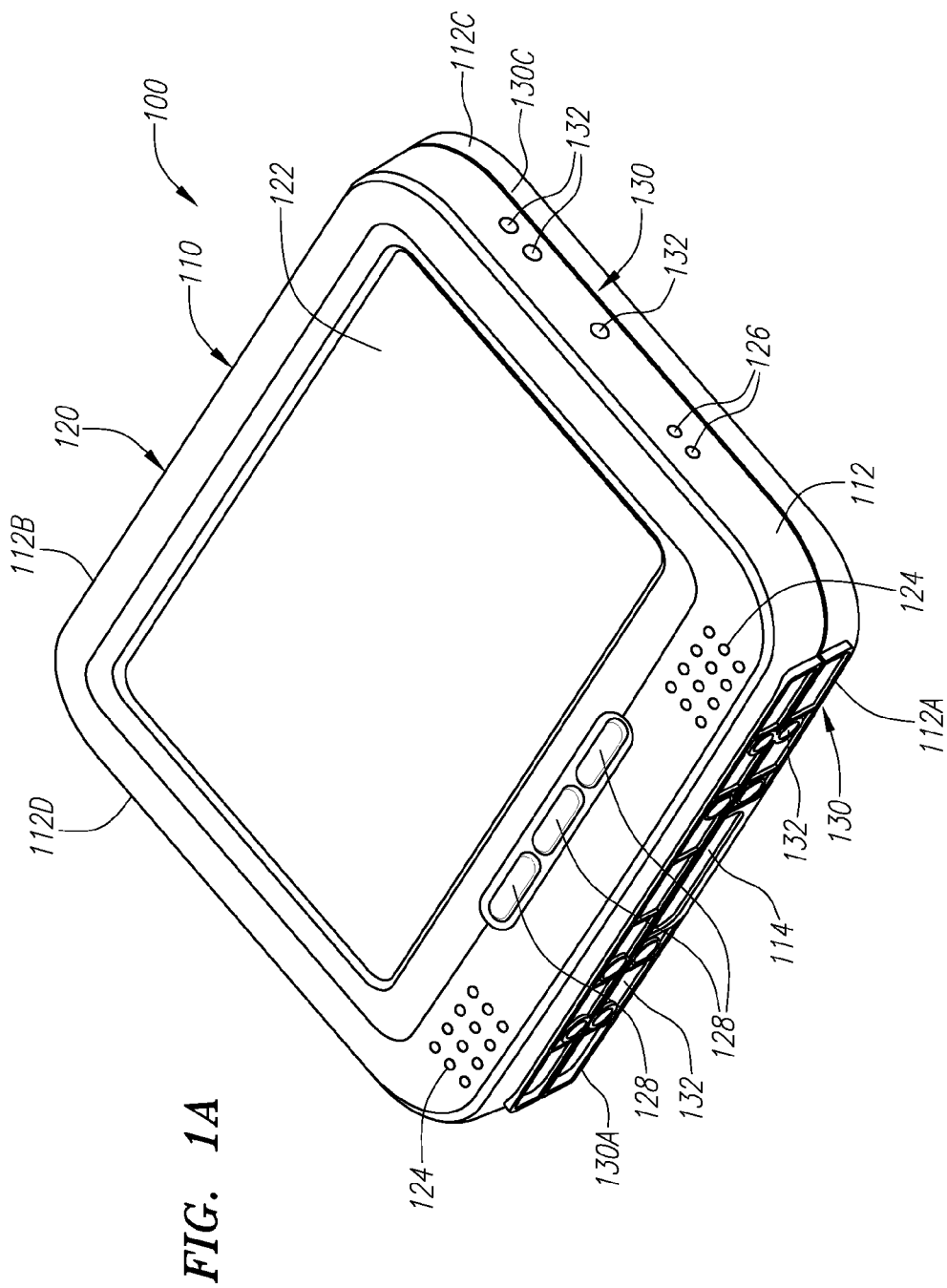
FIGS. 1A-B are exemplary top-level drawings illustrating an embodiment of the user interface device, wherein the user interface device includes a communication port.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not illustrate every aspect of the present invention and do not limit the scope of the invention.

DETAILED DESCRIPTION OF THE PREFERRED EMBODIMENTS

Since user interface devices currently must be produced in multiple versions to permit installation via different conventional mounting systems, an improved user interface device that is compatible with each of the conventional mounting systems can prove desirable and provide a basis for a wide range of system applications, such as vehicle information systems for use aboard automobiles, aircraft, and other types of vehicles. This result can be achieved, according to one embodiment disclosed herein, by a user (or passenger) interface device 100 as illustrated in FIGS. 1A-B.

Figure 1B:
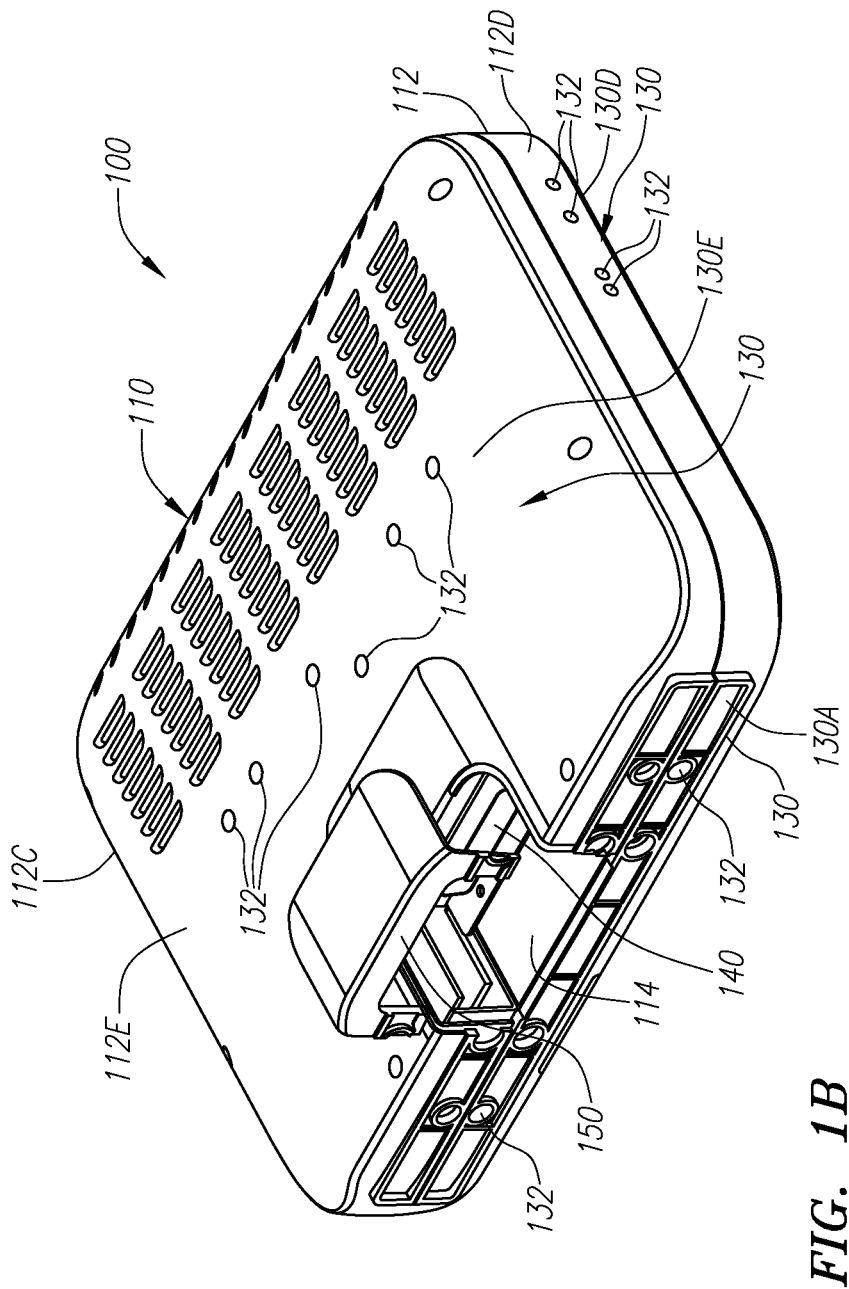

Turning to FIGS. 1A-B, the user interface device 100 is configured for presenting selected viewing content. The user interface device 100 can be provided with a form factor suitable for handheld use and preferably is adapted for installation at a suitable location. For example, the user interface device 100 can be installed at a stationary location, such as a building, and/or can be used in portable applications, such as within a passenger cabin 430 (shown in FIGS. 7A-B) of a passenger vehicle 400 (shown in FIGS. 5A-B). The user interface device 100 can be installed in any conventional manner such as via a conventional mounting system 200 (shown in FIGS. 3A-B and 4A-B), which can engage (and/or couple with) the user interface device 100.

The user interface device 100 thereby can select and present viewing content and, when not in use, can be stowed in a manner that does not interfere with the user (or passenger). As desired, the user interface device 100 can support communications with one or more available content sources 310 (shown in FIGS. 5A-B). The content sources 310 in one preferred embodiment can include one or more other user interface devices 100. Stated somewhat differently, the user interface device 100 can select and present viewing content provided by another user interface device 100 and/or a selected content source 310. The user interface device 100 likewise can upload viewing content to the available content sources 310, including the other user interface devices 100.

Advantageously, each user interface device 100 is produced with a common form factor and is compatible for use with any conventional mounting system 200. The user interface devices 100 thus can, without modification, be received by, and engaged by, any mounting system 200 installed in the building and/or vehicle 400. A malfunctioning user interface device 100, for example, can be easily removed from the mounting system 200 and replaced with another user interface device 100. The malfunction thereby can be readily addressed with minimal inconvenience to the user, and the malfunctioning user interface device 100 can be discarded and/or repaired at a later time. Alternatively, and/or in addition, if provided as a handheld unit, the user interface device 100 can be removable from the mounting system 200 for use. Thereby, only one version of the user interface device 100 can be produced, purchased, and/or inventoried.

An exemplary embodiment of the user interface device 100 is illustrated in FIGS. 1A-B. Being disposed within an enclosure (or housing) 110, the user interface device 100 includes a content presentation system 120 for presenting selected viewing content (not shown). The viewing content can comprise any conventional type of audible and/or visible viewing content, such as stored (or time-delayed) viewing content and/or live (or real-time) viewing content, in the manner set forth in the co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which are assigned to the assignee of the present application and the respective disclosures of which are hereby incorporated herein by reference in their entireties.

The viewing content, for example, can have entertainment content, including audio content, such as music or audio books, and/or video content, such as motion pictures, television programming, or any other type of audiovisual work. As desired, other types of viewing content, including application software, such as media player programs or games, and/or textual materials, such as forms, reference materials, or other documents, can be selected for presentation by the user interface device 100. The viewing content likewise can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety.

Alternatively, and/or in addition to entertainment content, such as live satellite television programming and/or live satellite radio programming, the viewing content likewise can include two-way communications such as real-time access to the Internet 316 (shown in FIG. 5B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety. It is understood that the exemplary viewing content as shown and described herein are not exhaustive and are provided herein for purposes of illustration only and not for purposes of limitation.

The viewing content can be selected from viewing content stored internally within the user interface device 100 and/or provided by the available content sources 310 (shown in FIGS. 5A-B), including another user interface devices 100, external to the user interface device 100. Illustrative user interface devices 100 are shown and described in the co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, the disclosures of which were incorporated herein by reference above.

The user interface device 100 can communicate with each content source 310, in any conventional manner, including via wired communications and/or wireless communications. Illustrative communication systems and methods are disclosed in the above-referenced co-pending United States patent applications, "SYSTEM AND METHOD FOR DOWNLOADING FILES," Ser. No. 10/772,565, filed on Feb. 4, 2004; "SYSTEM AND METHOD FOR MANAGING CONTENT ON MOBILE PLATFORMS," Ser. No. 11/123,327, filed on May 6, 2005; "PORTABLE MEDIA DEVICE AND METHOD FOR PRESENTING VIEWING CONTENT DURING TRAVEL," Ser. No. 11/154,749, filed on Jun. 15, 2005; and "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005.

As shown in FIG. 1B, for example, the user interface device 100 advantageously can include a communication port (or connector) 140 for supporting communications between the user interface device 100 and a selected content source 310. The communication port 140 can comprise any conventional type of communication port and can be configured to cooperate with a communication port (or connector) 360 (shown in FIG. 2A). The communication port 360 can provide communication with the content source 310 directly and/or indirectly via an intermediate network, such as a content distribution system 320 (shown in FIGS. 5A-B). If the communication port 140 and the communication port 360 support wired communications between the user interface device 100 and the content source 310, for example, the communication port 360 can comprise a conventional cable assembly 362, such as a cable harness, and can be terminated with a suitable communication connector (or port) 366. Stated somewhat differently, the cable assembly 362 can be at least partially incorporated with the content distribution system 320 and/or can comprise a wired access point for the content distribution system 320. The received user interface device 100 and the content source 310 thereby can communicate via the cable assembly 362.

The viewing content can be presented by the user interface device 100 in any conventional manner, preferably substantially in real-time. For example, the user interface device 100 can download the viewing content in the manner disclosed in the aforementioned co-pending United States patent applications, entitled "SYSTEM AND METHOD FOR DOWNLOADING FILES," Ser. No. 10/772,565, filed on Feb. 4, 2004; and "PORTABLE MEDIA DEVICE AND METHOD FOR PRESENTING VIEWING CONTENT DURING TRAVEL," Ser. No. 11/154,749, filed on Jun. 15, 2005, the disclosures of which were incorporated herein by reference above. As desired, the user interface device 100 likewise can store the downloaded viewing content. The user interface device 100 thereby can present the viewing content at any time regardless of whether communication with the content source 310 is maintained.

The viewing content likewise can be streamed to the user interface device 100 from the content source 310. Stated somewhat differently, the viewing content can be momentarily stored (or cached) by the user interface device 100. The viewing content likewise can be streamed in any conventional manner. Illustrative sources for streaming the viewing content can include terrestrial content sources and/or satellite content sources. For example, live television programming can be streamed by one or more terrestrial content source, such as a broadcast television system (not shown), and/or by one or more satellite content source, such as a Direct Broadcast Satellite (DBS) system (not shown). If the user interface device 100 disposed in a passenger vehicle 400 in the discussed below with reference to FIGS. 5A-B, the viewing content can be streamed to the user interface device 100 from a content source 310, such as a media server system 312 (shown in FIGS. 5A-B), installed aboard the passenger vehicle 400. Exemplary systems and methods for streaming viewing content are shown and described in the co-pending United States patent application, entitled "PORTABLE MEDIA DEVICE AND METHOD FOR PRESENTING VIEWING CONTENT DURING TRAVEL," Ser. No. 11/154,749, filed on Jun. 15, 2005.

By streaming the viewing content to the user interface device 100, loss, such as by theft, of the user interface device 100 therefore does not also result in loss of the viewing content. To help further ensure the security of the viewing content, the viewing content preferably is streamed to the user interface device 100 in an encrypted format and/or can be provided with one or more other digital rights management (DRM) controls. Thereby, the viewing content can be protected against any unauthorized use, copying, and/or dissemination, and/or, even if intercepted or otherwise stolen, the encrypted viewing content will not be readily usable. The viewing content can be encrypted in any conventional manner, including the use of proprietary encryption techniques. By streaming the viewing content from the content source 310, the quantity and complexity of the components comprising the user interface device 100 can be reduced. Thereby, the user interface device 100 can be provided as the portable, handheld media presentation system as discussed above. The weight, complexity, and power consumption of the user interface device 100 likewise can be reduced; whereas, the overall device reliability of the user interface device 100 can be increased.

The viewing content, such as stored (or time-delayed) viewing content, therefore can advantageously be provided from, or stored in, a central location. Thereby, management of the viewing content, including updating the viewing content, is facilitated, and the user interface device 100 can present viewing content selected from extensive resources of the content source 310. Further, if the viewing content comprises real-time viewing content, including, for example, live satellite television programming, live satellite radio programming, and/or real-time Internet access, the user interface device 100 can present the live viewing content substantially in real-time. The user interface device 100 therefore is not limited to presenting viewing content that can be stored within its resources, which can be limited in comparison with the extensive resources of the content source 310. As a result, the user interface device 100 can be configured to provide a wide variety of viewing content choices, which can be selected and presented on demand.

The content presentation system 120 is shown as including a video presentation system 122 for visually presenting a video portion of the viewing content and an audio presentation system for audibly presenting an audio portion of the viewing content. The video presentation system 122 can be provided in any conventional manner. For example, the user interface device 100 can comprise a seat video system for use with a vehicle information system 300 (shown in FIGS. 5A-B). The video presentation system 122 can have a viewing screen with an appropriately-sized viewable area with sufficient resolution for visually presenting the viewing content. Illustrative video resolutions for presenting viewing content can include any color graphics adapter (CGA) resolution, enhanced graphics adapter (EGA) resolution, video graphics array (VGA) resolution, extended graphics array (XGA) resolution, super extended graphics array (SXGA) resolution, ultra extended graphics array (UXGA) resolution, and/or wide extended graphics array (WXGA) resolution.

Alternatively, and/or in addition, the user interface device 100 can be provided as a handheld device, such as a personal media device, a laptop computer, a palmtop computer, a personal digital assistant (PDA), cellular telephone, and/or a MPEG Audio Layer 3 (MP3) device in the manner disclosed in the above-referenced co-pending United States patent applications, entitled "SYSTEM AND METHOD FOR DOWNLOADING FILES," Ser. No. 10/772,565, filed on Feb. 4, 2004; and entitled "PORTABLE MEDIA DEVICE AND METHOD FOR PRESENTING VIEWING CONTENT DURING TRAVEL," Ser. No. 11/154,749, filed on Jun. 15, 2005, the disclosures of which were incorporated herein by reference above. The audio presentation system can be provided in any conventional manner, such as via one or more integrated speaker systems 124 and/or audio communication ports 126. The audio ports 126 enable the audio viewing content to be presented via a peripheral audio system, such as headphones and/or an external speaker system.

The user interface device 100, as desired, can include an input system 128 for selecting the viewing content and/or controlling the presentation of the selected viewing content.

Figure 3A:
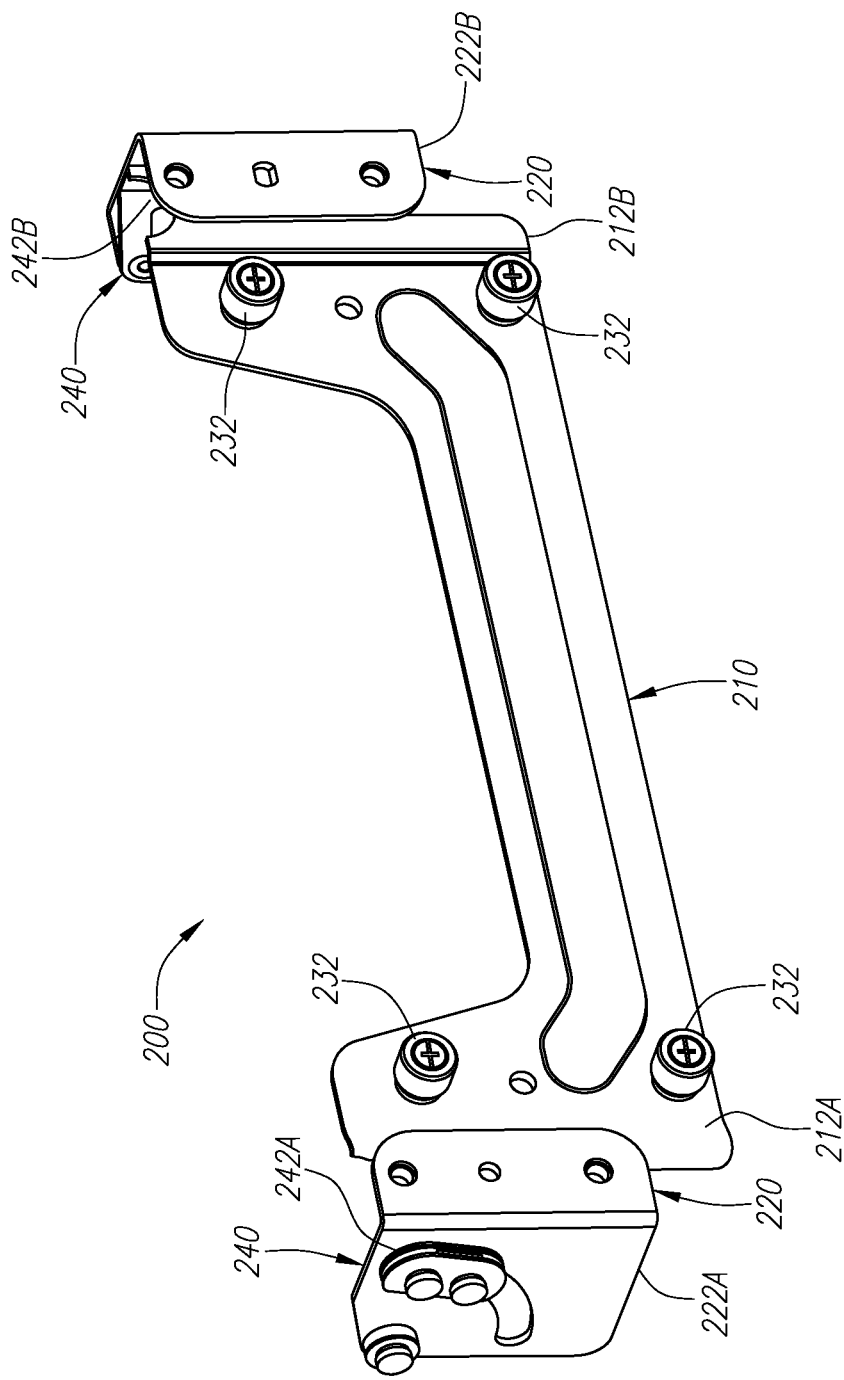
FIG. 3A is an exemplary detail drawing illustrating an embodiment of a mounting system for supporting the user interface device of FIGS. 1A-B, wherein the mounting system is configured for installation at a suitable surface.

Although shown in FIG. 3A as comprising one or more switches (or pushbuttons), such as a keyboard or a keypad, the input system 128 can be provided in any conventional manner and can include a pointing device (not shown), such as a mouse, trackball, or stylus. As desired, the input system 128 can be at least partially integrated with, and/or separable from, the user interface device 100. The input system 128 likewise can include one or more communication ports (not shown) for coupling a peripheral input device (not shown), such as a full-size computer keyboard, an external mouse, and/or a game pad, with the user interface device 100. As desired, the input system 128 can be at least partially combined with the video presentation system 122. The input system 128 thereby can comprise a touchscreen system and/or a menu system for selecting viewing content.

As illustrated in FIGS. 1A-B, the user interface device 100 is disposed within an enclosure (or housing) 110. Each user interface device 100 advantageously is produced with a common form factor and can, without modification, be received by, and engaged by, any conventional mounting system 200 (shown in FIGS. 3A-B and 4A-B). Thereby, only one version of the user interface device 100 needs to be produced, purchased, and/or inventoried. The housing 110 of the user interface device 100 is shown as providing at least one docking interface system 130. The docking interface system 130 can be provided on any suitable housing surface 112 of the housing 110 and enables the user interface device 100 to couple with (and/or engage) a selected mounting system 200. As desired, the docking interface system 130 likewise can be configured to interchangeably couple (and/or engage) the user interface device 100 with each of a selected variety of mounting systems 200.

The user interface device 100 of FIGS. 1A-B includes a plurality of the docking interface systems 130. For example, the user interface device 100 is shown as providing a lower docking interface system 130A on a lower portion 112A of the housing 110; whereas, side docking interface systems 130C, 130D can be provided on respective opposite side regions 112C, 112D of the housing 110. A back docking interface system 130E likewise can be included on a back portion 112E of the housing 110, and an upper docking interface system (not shown) can be provided on a upper portion 112B of the housing 110, as desired. The docking interface systems 130 can extend across approximately an entire dimension of user interface device 100, as illustrated by the lower docking interface system 130A, and/or can be provided on a selected portion of the housing 110, as illustrated by the side docking interface system 130C. Although the user interface device 100 is shown and described as providing one docking interface system 130 on each selected portion of the housing 110 for purposes of illustration only, any predetermined number of the docking interface systems 130 can be provided on each housing portion. The number and/or arrangement (or positioning) of the docking interface systems 130 is based upon the installation requirements of the selected mounting systems 200.

Figure 3B:
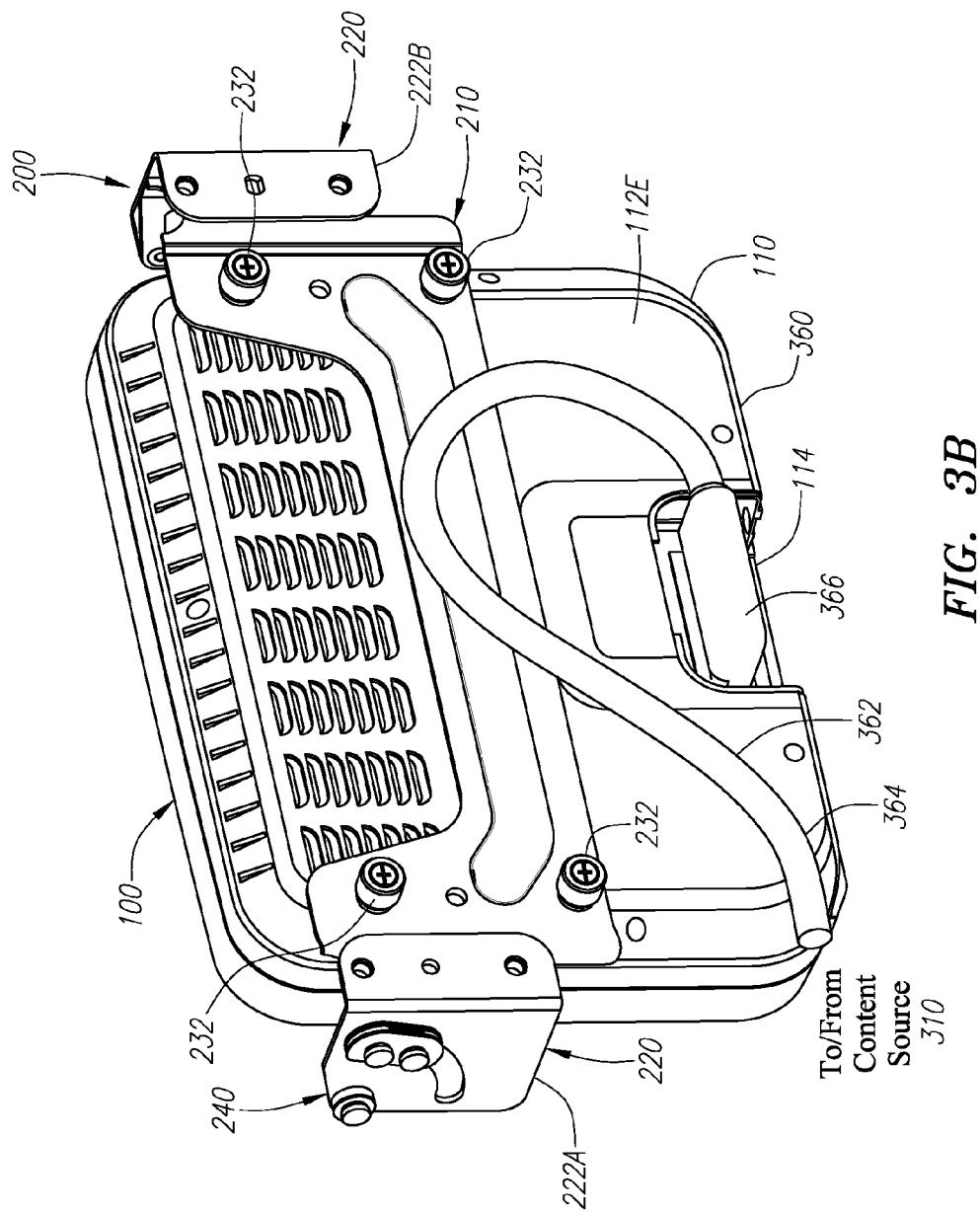
FIG. 3B is an exemplary detail drawing illustrating the mounting system of FIG. 3A coupled with the user interface device of FIGS. 1A-B.

To facilitate engagement between the user interface device 100 and the mounting system 200, each docking interface system 130 of the user interface device 100 and the mounting system 200 preferably include one or more sets of cooperating detents 132, 232 (shown in FIGS. 3A-B). The term "detents" refers to any combination of mating elements, such as blocks, tabs, pockets, slots, ramps, locking pins, cantilevered members, support pins, and the like, that may be selectively or automatically engaged and/or disengaged to couple or decouple the user interface device 100 and the mounting system 200 relative to one another. As illustrated in FIGS. 3A-B, for example, the detents 232 of the mounting system 200 can comprise one or more fasteners, such as screws, and the detents 132 of the user interface device 100 can include one or more mating fasteners, such as threaded inserts. The user interface device 100 thereby can be received and engaged by the mounting system 200 and, as desired, readily removed from the mounting system 200. It will be appreciated that the cooperating detents as illustrated and described above are merely exemplary and not exhaustive.

The detents 132 of each docking interface system 130 can be provided with any suitable number and/or arrangement (or pattern) for coupling the user interface device 100 with each mounting system 200. The number and/or arrangement of the detents 132 is based upon the installation requirements of the mounting systems 200, such as the number and/or arrangement of the detents 232 for each mounting system 200. The docking interface systems 130 preferably include detents 132 for engaging the detents 232 for each of a selected variety of the mounting systems 200. For example, a first subset of the detents 132 of the docking interface system 130 can be used for engaging the detents 232 of a first mounting system 200; whereas, a second subset of the detents 132 of the docking interface system 130 can be used for engaging the detents 232 of a second mounting system 200. Some detents 132 may be included in more than one subset, as desired.

It will be appreciated that, even if several versions of the user interface device 100 are desired, the housings 110 of each version can include the docking interface systems 130 for coupling with the selected mounting systems 200. For example, two versions of the user interface device 100 can be produced: one version having a housing 110 with large overall housing dimensions to accommodate a large viewing screen; and another version having a housing 110 with small overall housing dimensions to accommodate a smaller viewing screen. The housings 110 for each version of the user interface device 100 can advantageously be provided with the uniform docking interface systems 130. Each version of the user interface device 100 thereby can, without modification, be engaged by the selected mounting systems 200 in the manner set forth above.

Figure 2A:
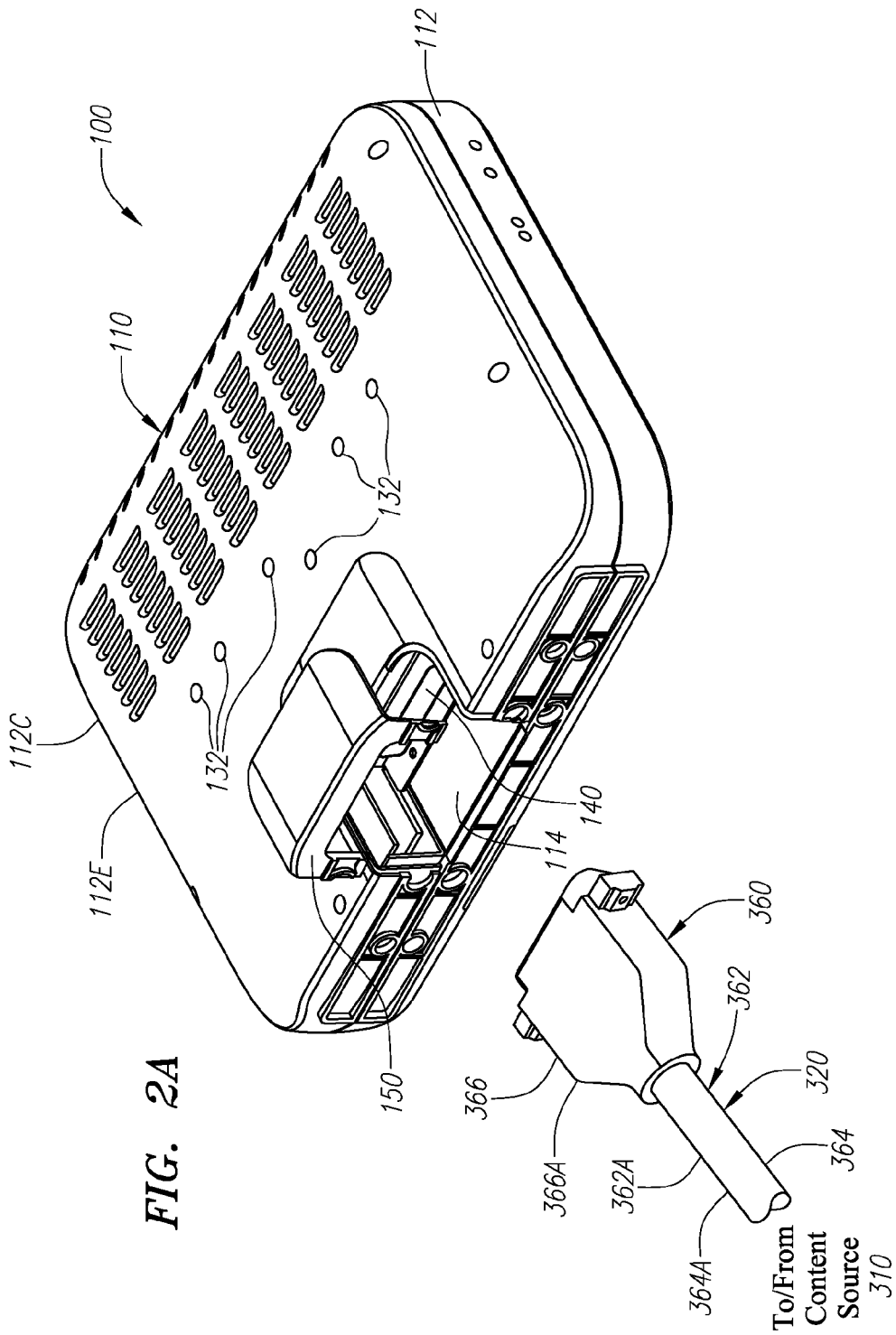
FIG. 2A is an exemplary detail drawing illustrating an embodiment of the user interface device of FIGS. 1A-B, wherein the user interface device includes a communication port for supporting communications between the user interface device and a content source.
Figure 2C:
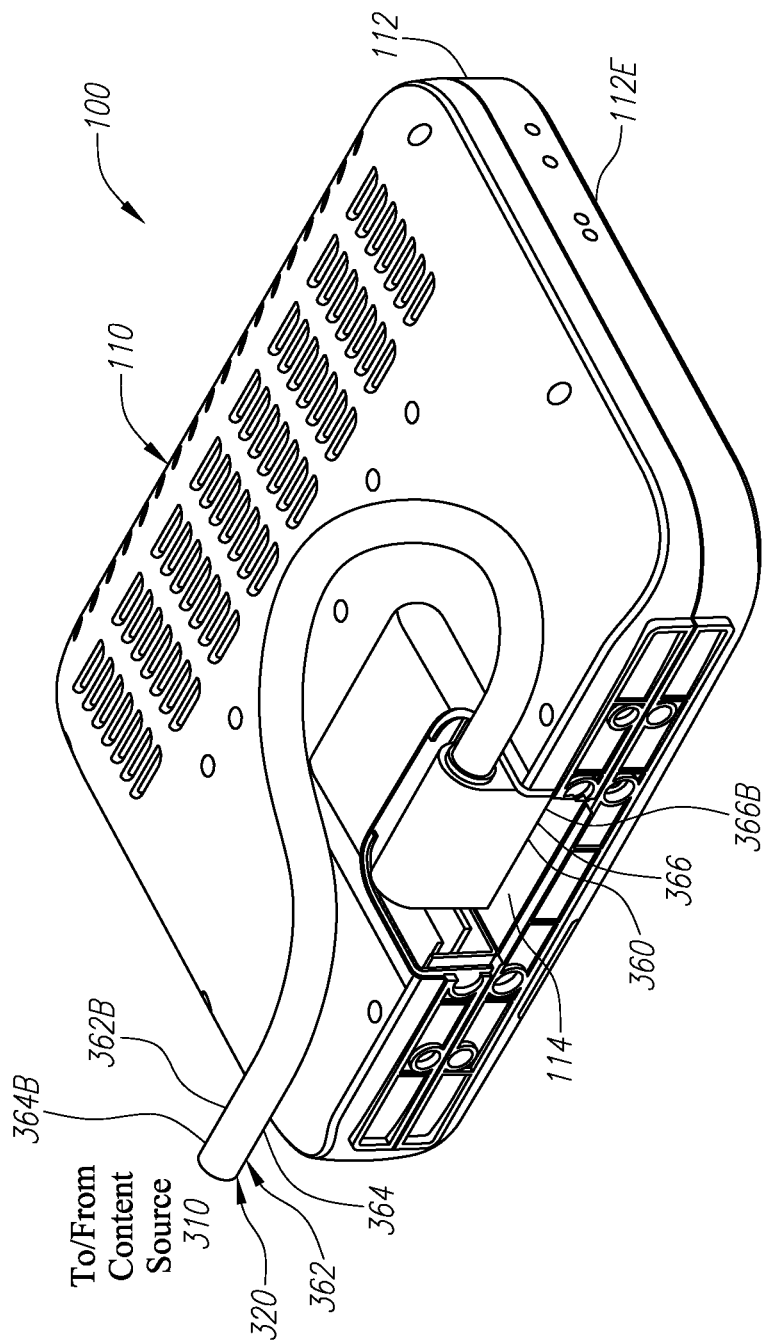
FIG. 2C is an exemplary detail drawing illustrating the user interface device of FIG. 2A, wherein the user interface device and the content source communicate via a second selected communication cable assembly coupled with the communication port.

The structure and operation of preferred embodiments of the communication port 140 are discussed and illustrated with reference to FIGS. 2A-C. In the manner discussed in more detail above, the communication port 140 can be configured to support wired communications and/or wireless communications. Turning to FIG. 2A, the communication port 140 can be provided at any suitable surface 112 of the housing 110. The communication port 140 can extend from the housing 110 and/or, as shown, can be at least partially disposed within the housing 110. The housing 110 of the user interface device 100 is shown as forming a recessed housing region (or surface) 114 for accommodating the communication port 140. When the communication port 140 is in communication with the communication port 360, the user interface device 100 can thereby communicate with one or more content sources 310 (shown in FIGS. 5A-B) in the manner set forth above.

In the manner set forth in more detail above with reference to FIGS. 1A-B, the communication port 140 can comprise a wired communication connector and be configured to couple with a communication cable assembly 362. The communication cable assembly 362 can be provided as a conventional cable assembly and, as illustrated in FIG. 2A, can include a communication cable 364 and a communication connector 366. The communication cable 364 is terminated by the communication connector 366, which can engage, and couple with, the communication connector 140. The recessed housing region 114 is formed with suitable dimensions to at least partially receive the communication cable assembly 362. As shown in FIG. 2B, the recessed housing region 114 can receive the communication connector 366 when communication between the user interface device 100 and the content source 310 is desired. The communication connector 366 thereby can couple with the communication connector 140.

When the communication connector 366 and the communication connector 140 are coupled, the communication cable assembly 362 extends from the user interface device 100. The manner by which the communication cable assembly 362 extends from the user interface device 100 preferably is adjustable. For example, the manner by which the communication cable assembly 362 extends from the user interface device 100 can be adjusted to facilitate the installation and/or use of the user interface device 100. A communication cable assembly 362 with suitable characteristics therefore can be selected for supporting communications between the user interface device 100 and the content source 310. Thereby, the communication cable assembly 362 can be configured to extend from the user interface device 100 in any desired manner.

As shown in FIG. 2B, for instance, the communication connector 140 can be coupled with a communication connector 366A of a first selected communication cable assembly 362A. Since the communication connector 366A comprises a straight communication connector, a communication cable 364A of the first selected communication cable assembly 362A can extend approximately axially from the communication connector 140 and, therefore, from the user interface device 100 as illustrated. Alternatively, the communication connector 140 can be coupled with a communication connector 366B of a second selected communication cable assembly 362B as illustrated in FIG. 2B. The communication connector 366B is shown as being a right-angle communication connector, and a communication cable 364B of the second selected communication cable assembly 362B extends from a side of the communication connector 366B. The communication cable 364B thereby can extend at approximately at a right angle from the communication connector 140 and the user interface device 100. In like manner, the communication cable assembly 362 can extend from the user interface device 100 as desired.

Returning to FIG. 2B, the housing 110 can include a protective cover assembly 150. The cover assembly 150 can be at least partially integrated with the housing 110 and/or, as illustrated, separate from the housing 110. If integrated with the housing 110, the cover assembly 150 can be retractable within the housing 110 and/or coupled with the housing 110, for example, via a hinge assembly (not shown). The cover assembly 150 can protect the communication connector 140 and/or the communication connector 366 during use and, when deployed, forms a channel 152 through which the communication cable assembly 362 can extend.

As discussed above, the user interface device 100 can be installed at a predetermined location in any conventional manner such as via a conventional mounting system, such as the mounting systems 200 shown in FIGS. 3A-B and 4A-B. Turning to FIG. 3A, the mounting system 200 is shown as including a docking system 210 and an installation system 220. The docking system 210 enables the user interface device 100 (shown in FIGS. 1A-B) to couple with the mounting system 200; whereas, the installation system 220 provides a mechanism for installing the mounting system 200 at the predetermined location. Since the user interface device 100 is configured to conform with the conventional mounting system 200, the housing 110 (shown in FIGS. 1A-B) of the user interface device 100 preferably is formed to cooperate with the docking system 210. The back portion 112E (shown in FIG. 1B) of the housing 110, for example, can be formed to receive, and/or to be received by, at least a portion of the docking system 210. The docking system 210 likewise can include one or more detents 232, and the user interface device 100 can provide one or more detents 132 (shown in FIGS. 1A-B) for cooperating with the detents 232. Engagement between the user interface device 100 and the mounting system 200 thereby can be facilitated in the manner set forth in more detail above.

Figure 7A:
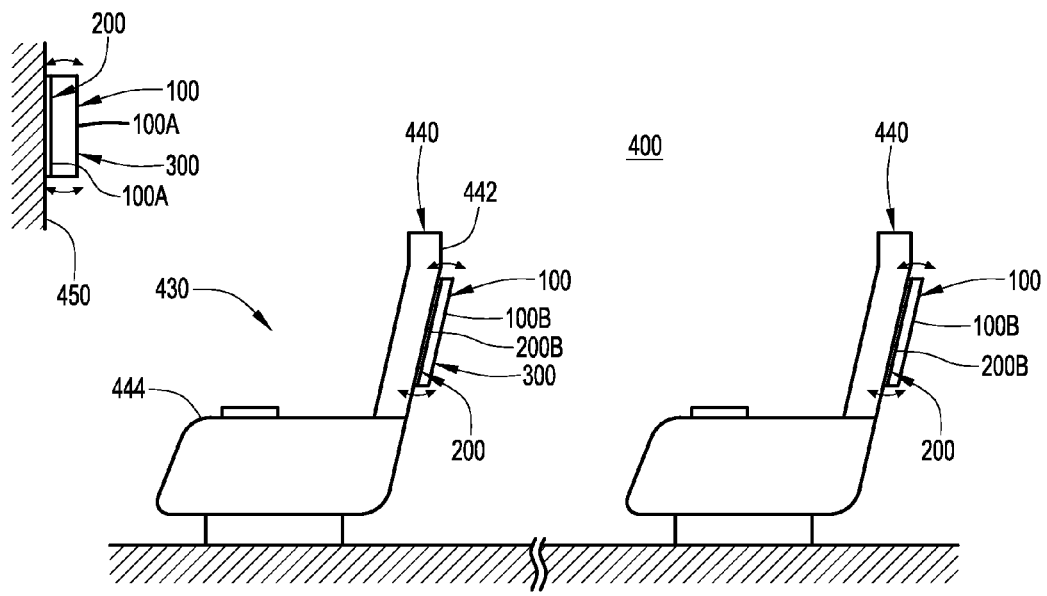
FIG. 7A is an exemplary top-level drawing illustrating an embodiment of the vehicle information systems of FIGS. 5A-B, wherein the mounting system couples the user interface device with a suitable surface within a passenger cabin.

The mounting system 200 is shown in FIG. 3A as being configured for installation at a selected mounting surface 450 (shown in FIG. 7A). Illustrative mounting surfaces can include a wall and/or a ceiling in a building as well as a wall, a ceiling, a bulkhead, and/or a seatback 442 (shown in FIG. 7A) in a passenger vehicle 400 (shown in FIGS. 5A-B). To install the mounting system 200 at the mounting surface 450, the installation system 220 of the mounting system 200 is configured to couple with the mounting surface 450. The installation system 220 can couple with the mounting surface 450 in any conventional manner, including via at least one fastener, at least one cooperating detent, and/or bonding via, for example, use of welding and/or an adhesive. As desired, the installation system 220 can be installed over, and/or disposed (or recessed) at least partially within, the mounting surface 450. Once the installation system 220 is coupled with the mounting surface 450, the user interface device 100 can be coupled with, and engaged by, the mounting system 200.

As desired, the docking system 210 and the installation system 220 can be provided as a single integrated unit or, as shown in FIG. 3A, as separate systems. If provided as separate systems, the docking system 210 and the installation system 220 can be coupled in any conventional manner, including any manner of fixed and/or adjustable coupling. The docking system 210 and the installation system 220, for example, can be coupled via an intermediate position adjustment system 240. As illustrated in FIG. 3A, the installation system 220 can comprise first and second installation members 222A, 222B. The first installation member 222A is coupled with first selected region 212A of the docking system 210 via a first position adjustment system 242A; whereas, a second position adjustment system 242B couples the second installation member 222B with second selected region 212B of the docking system 210.

The position adjustment system 240 can be of any conventional design and is illustrated in FIG. 3A as being a tilt mechanism. As shown in FIG. 3A, the position adjustment system 240 permits an angle formed between the docking system 210 and the installation system 220 to be adjustable within a predetermined range of angles. The predetermined range of angles, for instance, can include a continuous range of angles and/or discrete angles within the range. The position adjustment system 240 thereby enables adjustable positioning of the received user interface device 100 as installed via the mounting system 200. Although shown and described as a rotation about one axis for purposes of illustration only, the position adjustment system 240 can provide any conventional type of adjustment between the docking system 210 and the installation system 220, including linear displacements in one or more dimensions and/or angular displacements about one or more axes.

Interaction between the user interface device 100 of FIGS. 1A-B and the mounting system 200 of FIG. 3A is illustrated in FIG. 3B. When the mounting system 200 has been properly installed, the user interface device 100 can be disposed adjacent to the docking system 210 of the mounting system 200.

The housing 110 of the user interface device 100 and the docking system 210 can cooperate in the manner discussed above. The detents 132 (shown in FIGS. 1A-B) of the user interface device 100 and the detents 232 of the docking system 210 thereby engage, coupling the user interface device 100 with the docking system 210 as illustrated in FIG. 3B. The user interface device 100 thereby can be coupled with the docking system 210 and being supported by the mounting system 200. As desired, the communication port 140 (shown in FIG. 1B) can be coupled with the conventional cable assembly 362 to enable the user interface device 100 to present selected viewing content from a content source 310 via the cable assembly 362. The received user interface device 100 can be removed from the mounting system 200 in the reverse manner.

Although shown and described above as being configured for installation at a predetermined surface, such as the mounting surface 450 (shown in FIG. 7A) and/or the seatback 442 (shown in FIG. 7A), for purposes of illustration only, the mounting system 200 can be readily configured for installation at any conventional mounting location. The mounting system 200, for example, is illustrated in FIG. 4A as being configured for installation at a seat, such as a passenger seat 440 (shown in FIG. 7B). In the manner discussed above with reference to the mounting system 200 of FIGS. 3A-B, the mounting system 200 of FIG. 4A, once properly installed, can engage the user interface device 100. The mounting system 200 likewise can permit adjustable positioning of the received user interface device 100 as coupled with the mounting system 200. The user interface device 100 thereby can select and present viewing content and, when not in use, can be stowed in a manner that does not interfere with the user.

In the manner set forth in more detail above with reference to the mounting system 200 (shown in FIG. 3A), the mounting system 200 can include a docking system 210 and an installation system 220 as illustrated in FIG. 4A. The docking system 210 enables the user interface device 100 to couple with the mounting system 200; whereas, the installation system 220 provides a mechanism for installing the mounting system 200 at the armrest 444 (shown in FIG. 7B) of the passenger seat 440 (shown in FIG. 7B). Being provided in the manner discussed above, a lower portion 112A of the housing 110 of the user interface device 100 is formed to cooperate with the docking system 210. The docking system 210 likewise can include one or more detents 232, and the user interface device 100 can provide one or more detents 132 (shown in FIGS. 1A-B) for cooperating with the detents 232. The cooperating detents 132, 232 facilitate engagement between the user interface device 100 and the mounting system 200 as set forth above.

In the manner discussed above with reference to the position adjustment system 240 (shown in FIGS. 3A-B), the position adjustment system 240 enables the docking system 210 to rotate relative to the installation system 220. The position adjustment system 240 is shown as including first and second position adjustment members 244A, 244B. The first position adjustment member 244A permits rotation of the docking system 210 relative to the installation system 220 about a first axis of rotation; whereas, the docking system 210 can rotate relative to the installation system 220 about a second axis of rotation via the second position adjustment member 244B. The position adjustment system 240 likewise can include a release mechanism 244C for selectably permitting and/or inhibiting movement of the docking system 210 relative to the installation system 220. Although shown and described as a rotation about one axis for purposes of illustration only, the position adjustment members 244A, 244B each can provide any conventional type of adjustment, including linear displacements in one or more dimensions and/or angular displacements about one or more axes.

Figure 4B:
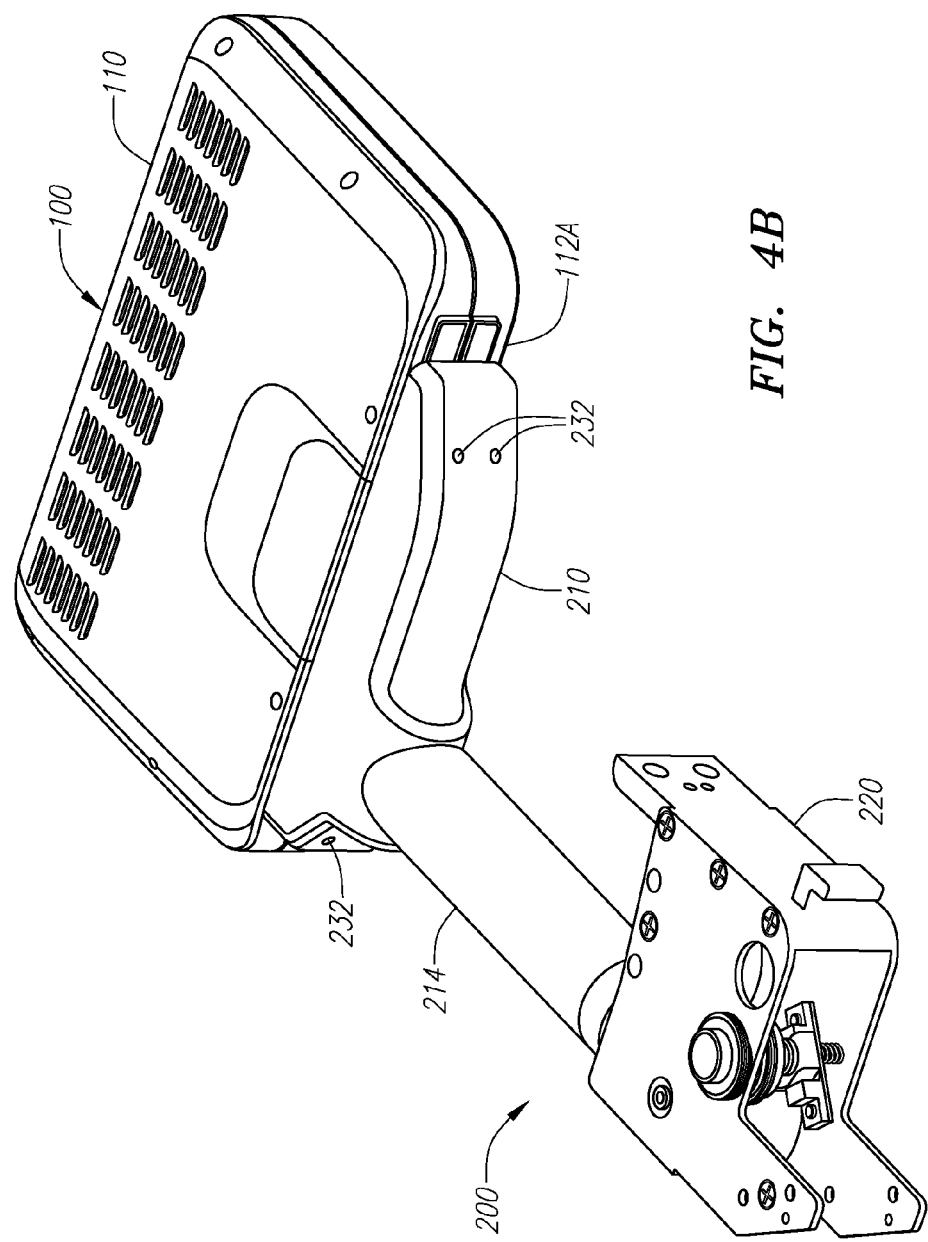
FIG. 4B is an exemplary detail drawing illustrating the mounting system of FIG. 4A coupled with the user interface device of FIGS. 1A-B.

When the mounting system 200 has been installed at the armrest 444, the user interface device 100 can be disposed adjacent to the docking system 210 of the mounting system 200 as illustrated in FIG. 4B. As the user interface device 100 approaches the docking system 210, the lower portion 112A of the user interface device 100 begins to cooperate with the docking system 210 in the manner discussed above until the user interface device 100 and the docking system 210 engage. The position adjustment members 244A, 244B enable adjustable positioning of the received user interface device 100 as coupled with the mounting system 200. As desired, the user interface device 100 can engage the mounting system 200 via the cooperating detents 132, 232. The received user interface device 100 can be removed from the mounting system 200 in the reverse manner.

Figure 5A:
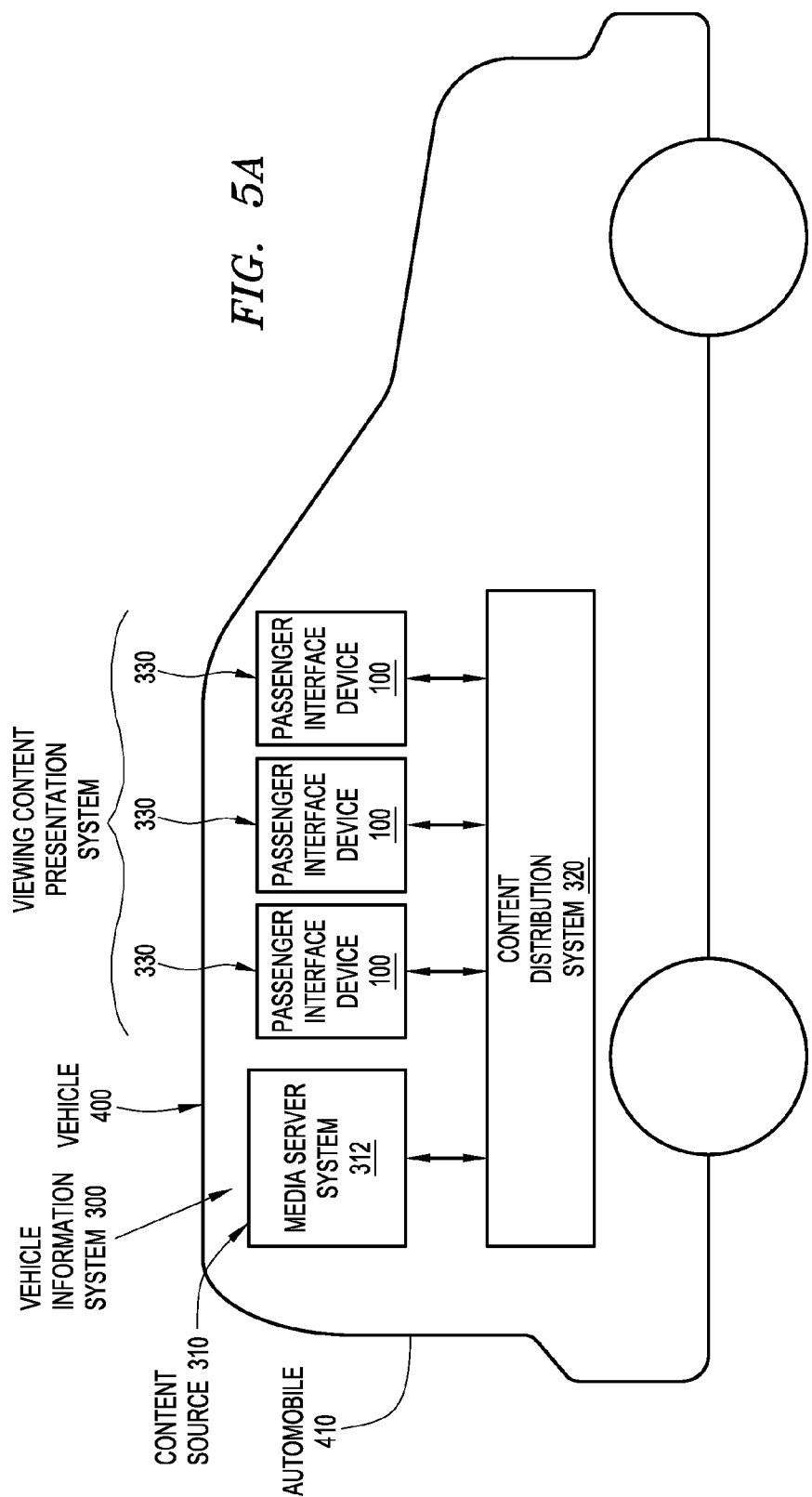
FIG. 5A is an exemplary top-level drawing illustrating the user interface device of FIGS. 1A-B, wherein the user interface device is incorporated into a vehicle information system installed aboard an automobile.
Figure 5B:
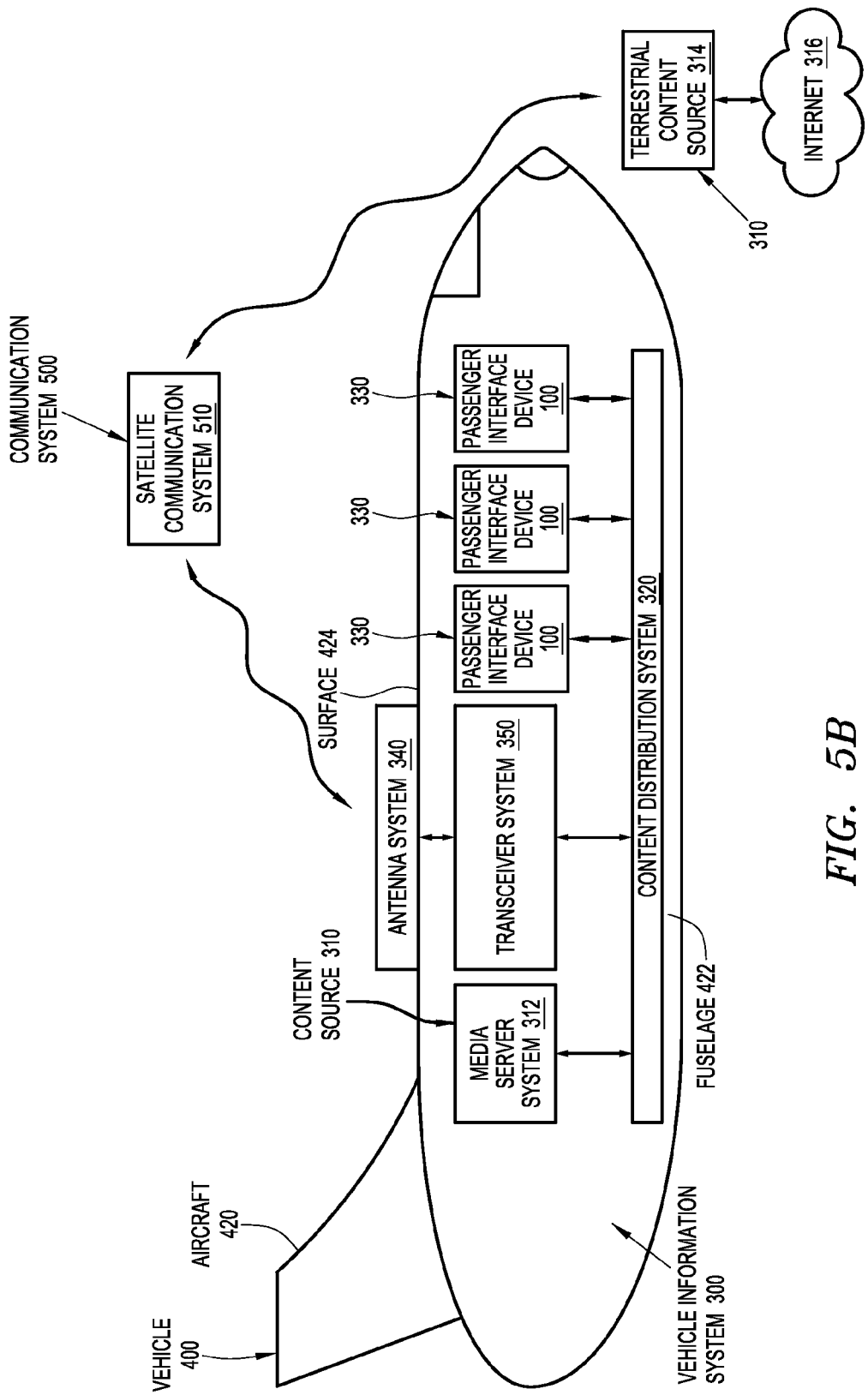
FIG. 5B is an exemplary top-level drawing illustrating the user interface device of FIGS. 1A-B, wherein the user interface device is incorporated into a vehicle information system installed aboard an aircraft.

The user interface device 100 as shown in FIG. 4B can be configured for stand-alone operation and/or for communication with one or more content sources 310 (shown in FIGS. 5A-B). Stated somewhat differently, the user interface device 100 can present viewing content selected from viewing content stored internally within the user interface device 100 and/or provided by the available content sources 310. The user interface device 100 can communicate with the content sources 310 in a wireless manner. Alternatively, and/or in addition, the user interface device 100 and the content sources 310 can communicate via wired communication. For example, the communication port 140 (shown in FIG. 1B) can be coupled with a conventional cable assembly 362 (shown in FIG. 2A) to enable the user interface device 100 to present selected viewing content from the content source 310 via the cable assembly 362. The cable assembly 362 can be provided outside the mounting system 200 as illustrated in FIG. 3B and/or can be at least partially disposed within the mounting system 200. As desired, the cable assembly 362 can be disposed within the docking system 210, and the communication cable 364 (shown in FIG. 2A) of cable assembly 362 can be fed through an internal channel (not shown) formed within a support section 214 of the docking system 210.

As set forth above, the user interface devices 100 are produced with a common form factor. Each user interface device 100 therefore can, without modification, be received by, and engaged by, any conventional mounting system 200, including the mounting system 200 of FIGS. 3A-B and/or the mounting system 200 of FIG. 4A-B. Since the user interface devices 100 likewise can be readily removed from the mounting systems 200, a malfunctioning user interface device 100 can be replaced with another user interface device 100 easily and with minimal inconvenience to the user. Further, if provided as a handheld unit, the user interface device 100 can be removable from the mounting system 200 for use in the manner discussed in more detail above.

Turning to FIGS. 5A-B, for example, the user interface device 100 can be applied in a vehicle information system 300 that can be configured for installation aboard a wide variety of vehicles 400. Exemplary types of vehicles can include an automobile 410 (shown in FIG. 5A), an aircraft 420 (shown in FIG. 5B), a bus, a recreational vehicle, a boat, and/or a locomotive, without limitation. If installed aboard an aircraft 420 as illustrated in FIG. 5B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

The vehicle information system 300 can distribute and present viewing content available from one or more content sources 310. Each content source 310 can be provided in any conventional manner, including in the manner set forth in the above-referenced co-pending United States patent applications, "SYSTEM AND METHOD FOR DOWNLOADING FILES," Ser. No. 10/772,565, filed on Feb. 4, 2004; and "PORTABLE MEDIA DEVICE AND METHOD FOR PRESENTING VIEWING CONTENT DURING TRAVEL," Ser. No. 11/154,749, filed on Jun. 15, 2005, as well as in the co-pending United States patent applications, entitled "SYSTEM AND METHOD FOR MANAGING CONTENT ON MOBILE PLATFORMS," Ser. No. 11/123,327, filed on May 6, 2005; and entitled "SYSTEM AND METHOD FOR RECEIVING BROADCAST CONTENT ON A MOBILE PLATFORM DURING INTERNATIONAL TRAVEL," Ser. No. 11/269,378, the disclosures of which were incorporated herein by reference above. The vehicle information system 300 likewise can receive viewing content from, and/or provide viewing content to, another content source (not shown). In other words, the selected content source 310 can be configured to operate as an intermediate (or relay) system in a larger communication system that includes one or more other content sources 310.

The vehicle information system 300 can include at least one internal content source 310, such as a media server system 312, that is installed aboard the vehicle 400 and/or at least one remote content sources 314, that can be external from the vehicle 400. Being disposed at a headend of the vehicle information system 300, the media server system 312 can provide overall system control functions for the vehicle information systems 300 and/or at least one media (or file) server system for storing preprogrammed content and/or the received viewing content, as desired. The media server system 312 can include, and/or communicate with, one or more conventional peripheral media storage systems (not shown). Exemplary peripheral media storage systems can include optical media devices, such as a digital video disk (DVD) system and/or a compact disk (CD) system, and or magnetic media systems, such as a video cassette recorder (VCR) system and/or a hard disk drive (HDD) system, of any suitable kind, for storing preprogrammed content and/or the received viewing content.

The vehicle information system 300 can communicate with the content sources 310 in any conventional manner, including via wired and/or wireless communications. As shown in FIG. 5B, for example, the vehicle information system 300 can include an antenna system 340 and a transceiver system 350 for communicating with the remote content source 314. The antenna system 340 preferably is disposed outside the vehicle 400, such as on an exterior surface 424 of a fuselage 422 of the aircraft 420. The vehicle information system 300 and the remote content source 314 therefore can communicate in any conventional wireless manner, including directly and/or indirectly via an intermediate communication system 500, such as a satellite communication system 510. As desired, the remote content source 314 can be configured to communicate with other terrestrial content sources (not shown). The remote content source 314 is shown in FIG. 5B as providing access to the Internet 316. Although shown and described as comprising the satellite communication system 510 for purposes of illustration, it is understood that the communication system 500 can comprise any conventional type of wireless communication system, such as a cellular communication system (not shown) and/or an Aircraft Ground Information System (AGIS) communication system (not shown).

One or more seat interface systems 330 are provided for enabling passengers to interact with the vehicle information system 300 during travel. Although the seat interface systems 330 can comprise conventional passenger seat interface systems, the seat interface systems 330 preferably include at least one user interface device 100 provided in the manner discussed above. The antenna system 340 and the transceiver system 350 of the vehicle information system 300 is illustrated in FIG. 5B as communicating with the media server system 312 and the user interface devices 100 via a distribution system 320. The distribution system 320 can be provided in any conventional manner and is configured to support any conventional type of communications, including wired communications and/or wireless communications.

Figure 6:
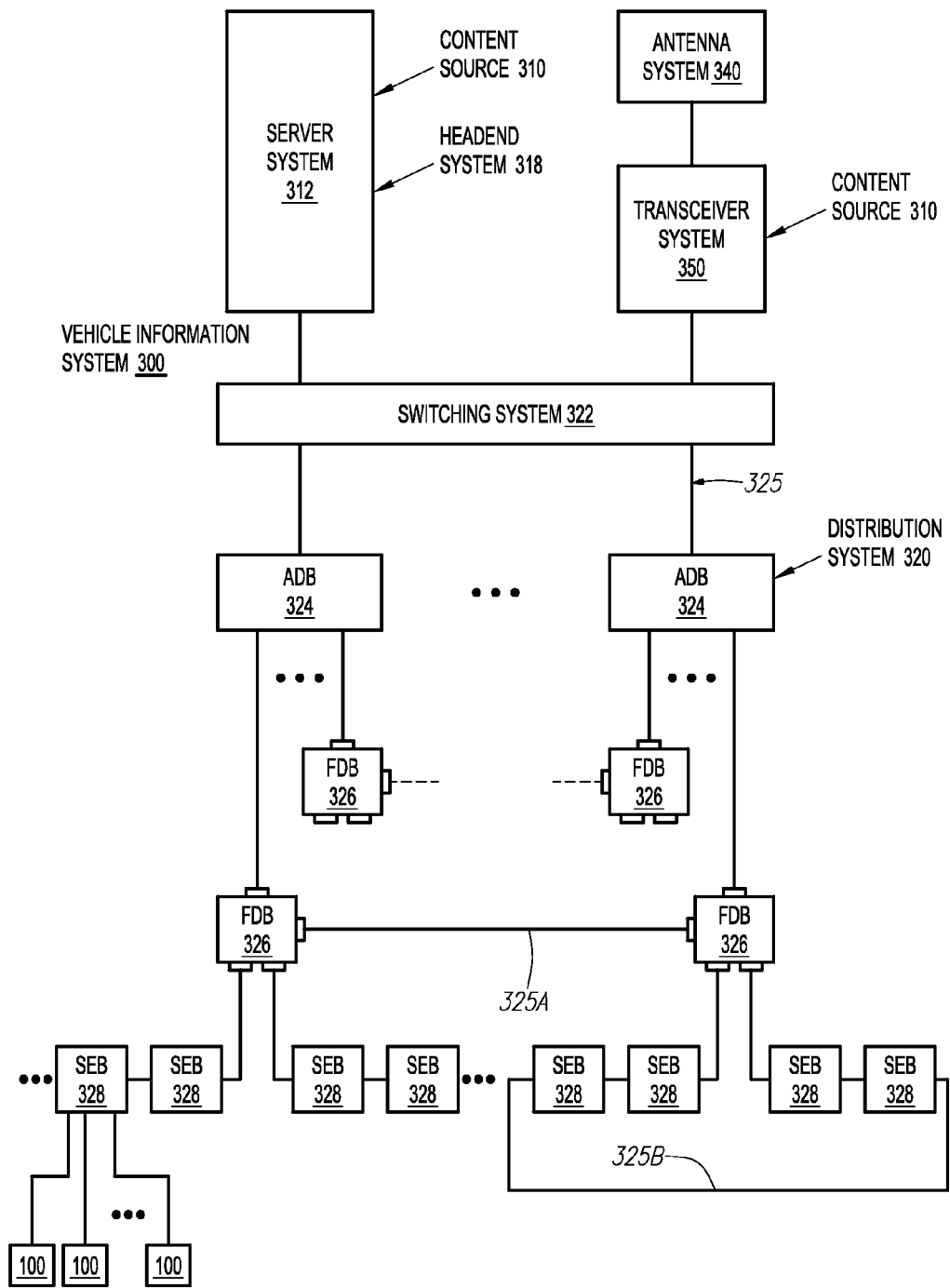
FIG. 6 is an exemplary detail drawing illustrating one preferred embodiment of a distribution system for the vehicle information systems of FIGS. 5A-B.

FIG. 6 illustrates an exemplary vehicle information system 300. The vehicle information system 300 is shown in FIG. 6 as including a headend system 318 and a plurality of passenger interface systems 200 that are configured to communicate via a distribution system 320. The headend system 318 can have at least one content source 310, such as a media server system 312 and/or an antenna system 340 and a transceiver system 350 each being provided in the manner set forth in more detail above. The distribution system 320 as shown in FIG. 6 is provided in the manner set forth in the above-referenced co-pending United States patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in the above-referenced U.S. Pat. Nos. 5,596,647, 5,617, 331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties. The distribution system 320 thereby can be provided as a plurality of area distribution boxes (ADBs) 324, a plurality of floor disconnect boxes (FDBs) 326, and a plurality of seat electronics boxes (SEBs) (and/or premium seat electronics boxes (PSEBs)) 328 being configured to communicate via a plurality of wired and/or wireless communication connections 325.

As illustrated in FIG. 6, the distribution system 320 can include a switching system 322 for providing an interface between the distribution system 320 and the headend system 318. The switching system 322 can comprise a conventional switching system, such as an Ethernet switching system, and is configured to couple the headend system 318 with the area distribution boxes 324. Preferably, the switching system 322 is coupled with each of the area distribution boxes 324 via a communication connection 325.

As desired, the switching system 322 can be provided as a plurality of interconnected switching sub-systems (not shown). If the switching system 322 is provided as a plurality of interconnected switching sub-systems, each of the switching sub-systems likewise can be configured to communicate with each of the area distribution boxes 324 via a communication connection 325. Each of the area distribution boxes 324, in turn, is coupled with a plurality of floor disconnect boxes 326 via a plurality of communication connections 325. Although the area distribution boxes 324 and the associated floor disconnect boxes 326 can be coupled in any conventional configuration, the associated floor disconnect boxes 326 preferably are disposed in a star network topology about a central area distribution box 324 as illustrated in FIG. 6.

Each floor disconnect box 326 is coupled with, and services, a plurality of daisy-chains of seat electronics boxes 328. Although it will be noted that the number and specific configuration of the seat electronics boxes 328 may be varied from system to system, the floor disconnect box 326 are shown and described with reference to FIG. 6 as being coupled with, and servicing, two daisy-chains of seat electronics boxes 328 for purposes of illustration. Each of the daisy-chains of seat electronics boxes 328 likewise can include any suitable number of seat electronics boxes 328 and is illustrated in FIG. 6 as including two daisy-chained seat electronics boxes 328. The seat electronics boxes 328, in turn, are configured to communicate with the plurality of passenger interface systems 200.

The floor disconnect boxes 326 advantageously can be provided as routing systems and/or interconnected in the manner set forth in the above-referenced co-pending United States patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. As desired, the distribution system 320 can include at least one FDB internal port bypass connection 325A and/or at least one SEB loopback connection 325B. Each FDB internal port bypass connection 325A is a communication connection 325 that permits floor disconnect boxes 326 associated with different area distribution boxes 324 to directly communicate. Each SEB loopback connection 325B is a communication connection 325 that directly couples the last seat electronics box 328 in each daisy-chain of seat electronics boxes 328 for a selected floor disconnect box 326 as shown in FIG. 6. Each SEB loopback connection 325B therefore forms a loopback path among the daisy-chained seat electronics boxes 328 coupled with the relevant floor disconnect box 326.

When the user interface device 100 is used in conjunction with a vehicle information system 300, a device management system (not shown) can manage, and/or provide logistical support for, one or more of the user interface device 100. An exemplary device management system is disclosed in the above-referenced co-pending United States patent application, "SYSTEM AND METHOD FOR DOWNLOADING FILES," Ser. No. 10/772,565, filed on Feb. 4, 2004, the disclosure of which was incorporated herein by reference above. Advantageously, each user interface device 100 can be provided with a device identification system for exchanging device identification data with a device management interface, which, in turn, can exchange management data with a device management database system. The device management system likewise can include a multi-bay docking station that exchanges device identification data and/or updates the viewing content of the user interface devices 100 while charging the battery systems of the user interface devices 100. As desired, the device management system can simplify chain of custody and to help ensure robust tracking of the user interface devices 100 by disposing the user interface devices 100 within one or more device containers in preparation for delivery to the vehicle 400.

Figure 7B:
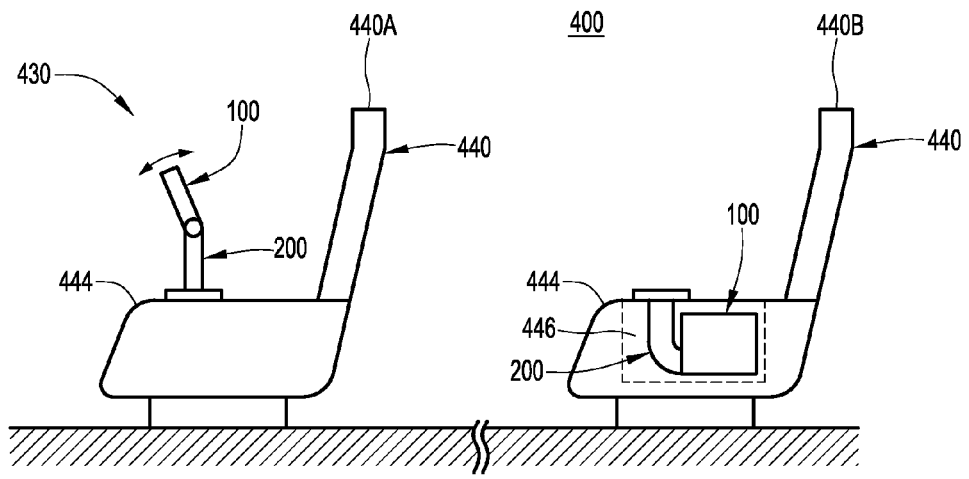
FIG. 7B is an exemplary top-level drawing illustrating an alternative embodiment of the vehicle information systems of FIGS. 5A-B, wherein the mounting system couples the user interface device with a passenger seat within a passenger cabin.

FIGS. 7A-B provide a view of a passenger cabin 430 of a passenger vehicle 400, such as the automobile 410 (shown in FIG. 5A) and/or the aircraft 420 (shown in FIG. 5B), aboard which a vehicle information system 300 has been installed. The passenger cabin 430 is illustrated as including a plurality of passenger seats 440, and a plurality of conventional mounting systems 200 have been installed at predetermined locations throughout the passenger cabin 430. The passenger seats 440 are associated with user interface devices 100. The user interface devices 100 are mounted within the passenger cabin 430 via mounting systems 200 and can be configured to present selected viewing content provided via the vehicle information system 300 in the manner discussed in more detail above.

Turning to FIG. 7A, the mounting systems 200 can be provided in the manner set forth above with reference to FIGS. 3A-B and are illustrated as being installed at any suitable surfaces within the passenger cabin 430. Mounting system 200A, for example, is shown as being installed at a cabin surface 450, such as a wall, ceiling, and/or bulkhead. The mounting system 200A therefore can include a docking system 210 (shown in FIG. 3A) and an installation system 220 (shown in FIG. 3A). The installation system 220 enables the mounting system 200A to be installed at the cabin surface 450; whereas, the docking system 210 can receive and engage user interface device 100A, which can comprise an overhead display system. Alternatively, or in addition, mounting systems 200B can be installed at seatbacks 442 of the passenger seats 440. Being provided in the above manner, each mounting system 200B can include an installation system 220 for installing the mounting system 200B at the selected seatback 442 and a docking system 210 for receiving and engaging user interface device 100B.

The user interface devices 100A, 200B can be provided in the manner discussed above with reference to FIGS. 1A-B. For example, each user interface device 100A, 100B can include a video presentation system 222 (shown in FIGS. 1A-B) for visually presenting a video portion of the viewing content. The user interface devices 100A, 200B likewise can include an audio presentation system and/or passenger controls for selecting the viewing content and/or controlling the presentation of the selected viewing content. The audio presentation system and/or passenger controls can be provided at armrests 444 of the relevant passenger seats 440 and/or can be integrated into the user interface devices 100A, 200B in the manner discussed above with reference to the integrated speaker system 224, audio communication ports 226, and/or the input system 228 (collectively shown in FIG. 3A).

Once properly installed, the mounting systems 200A, 200B can receive and engage the user interface devices 100A, 100B as set forth above. Each mounting system 200A, 200B preferably includes a position adjustment system 240 (shown in FIG. 3A) for providing adjustable positioning of the received user interface devices 100A, 100B as disposed within the respective mounting systems 200A, 200B. The user interface devices 100A, 100B thereby can select and present viewing content and, when not in use, can be stowed in a manner that does not interfere with the passenger. If provided as handheld units, the received user interface devices 100A, 100B likewise can be removed from the mounting systems 200A, 200B for use.

Turning to FIG. 7B, the mounting system 200 is illustrated as being configured for installation at an armrest 444 of a passenger seat 440. In the manner discussed above with reference to the mounting system 200 of FIGS. 4A-B, the mounting system 200 of FIG. 7B, once properly installed, can receive and engage the user interface device 100. The mounting system 200 likewise can permit adjustable positioning of the received user interface device 100 as disposed within the mounting system 200 as illustrated with the passenger seat 440A. The user interface device 100 thereby can select and present viewing content and, when not in use, can be stowed in a manner that does not interfere with the passenger. Passenger seat 440B is shown as including an internal compartment 446 for stowing the user interface device 100.

A malfunctioning user interface device 100 advantageously can be easily removed from the mounting system 200 and replaced with another user interface device 100. The malfunction thereby can be readily addressed with minimal inconvenience to the user, and the malfunctioning user interface device 100 can be discarded and/or repaired at a later time. Further, the user interface devices 100 are produced with a common form factor and therefore can, without modification, be received by, and engaged by, any mounting system 200 installed in the building and/or vehicle 400. Only one version of the user interface device 100 therefore needs to be produced, purchased, and/or inventoried.

The invention is susceptible to various modifications and alternative forms, and specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives.

What is claimed is:

1. A user interface device suitable for installation at a predetermined mounting location via a mounting system, comprising:
   a device housing that includes a docking interface system, said docking interface system enabling said device housing to couple with the mounting system and having a first set of device detents, the mounting system being disposed at a mounting location; and
   a content presentation system that presents selected viewing content, said content presentation system being disposed within said device housing,
   wherein the mounting system is selected from a group of conventional mounting systems and includes a first set of mounting detents and a second set of mounting detents having a different arrangement from the mounting detents in the first set, said first set of device detents interchangeably couples with one of said first set of mounting detents and said second set of mounting detents, and
   wherein said first set of device detents and the at least one of said first set of mounting detents and said second set of mounting detents selectively disengage to remove the device housing from the mounting system and wherein said content presentation system within the removed device housing presents the selected viewing content.

2. The user interface device of claim 1, wherein the user interface device communicates with a vehicle information system suitable for installation aboard a passenger vehicle, the vehicle information system comprising:
   a distribution system for communicating with a content source of a plurality of content sources, and
   wherein said first set of device detents cooperates with said first set of mounting detents and said second set of mounting detents.

3. The user interface device of claim 2, wherein the content source is remote from said distribution system.

4. The user interface device of claim 2, wherein said distribution system comprises at least one of a wired distribution system and a wireless distribution system.

5. The user interface device of claim 2, wherein said distribution system includes an access point for communicating with a communication port of said user interface device.

6. The user interface device of claim 5, wherein said access point comprises at least one of a wired access point and a wireless access point.

7. The user interface device of claim 2, wherein the vehicle information system further comprises a plurality of mounting systems disposed at predetermined mounting locations each being within the passenger vehicle, said docking interface system enabling said device housing to interchangeably couple with each of said mounting systems.

8. The user interface device of claim 2, wherein the vehicle information system further comprises a plurality of user interface systems for interchangeably coupling with said mounting system.

9. The user interface device of claim 2, wherein the vehicle information system is installed aboard an aircraft.

10. The user interface device of claim 2, wherein the vehicle information system is disposed aboard an aircraft, the aircraft comprising:
    a fuselage; and
    a plurality of passenger seats arranged within a passenger cabin within the fuselage;
    wherein the vehicle information system is coupled with said fuselage.

11. A user interface device suitable for installation at a predetermined mounting location via a mounting system, comprising:
    a device housing that includes a docking interface system, said docking interface system enabling said device housing to couple with the mounting system and having a device detent that facilitates engagement between said device housing and the mounting system, the mounting system disposed at a mounting location; and
    a content presentation system that presents selected viewing content, said content presentation system being disposed within said device housing,
    wherein the mounting system is selected from a group of conventional mounting systems and includes a position adjustment system and a mounting detent that cooperates with said device detent, said docking interface system interchangeably couples with each of the conventional mounting systems,
    wherein said device housing is removable from the mounting system and wherein said content presentation system within the removed device housing presents the selected viewing content, and
    wherein said position adjustment system includes a guiding channel of a predetermined length and a cooperating rail disposed within the guiding channel that provides control of both linear displacement from an initial position to a second position being different than the initial position about the predetermined length in one or more dimensions and angular displacements about one or more axes of the docking interface system relative to the mounting system.

12. The user interface device of claim 11, wherein said docking interface system has a plurality of device detents that facilitate the engagement between said device housing and the mounting system.

13. The user interface device of claim 12, wherein the mounting system includes a plurality of mounting detents, at least one of said device detents cooperating with at least one of the mounting detents.

14. The user interface device of claim 11, wherein said docking interface system permits said device housing to removably engage the mounting system.

15. The user interface device of claim 11, wherein said docking interface system permits said device housing to adjustably engage the mounting system.

16. The user interface device of claim 11, wherein said device housing includes a plurality of docking interface systems, a selected docking interface system selected from the plurality of docking interface systems enabling said device housing to couple with the mounting system.

17. The user interface device of claim 16, wherein two or more of said docking interface systems enable said device housing to couple with the mounting system.

18. The user interface device of claim 11, wherein said user interface device is suitable for installation at a predetermined mounting surface via the mounting system.

19. The user interface device of claim 18, wherein the predetermined surface is selected from a group consisting of a wall, a ceiling, a bulkhead, and a seatback.

20. The user interface device of claim 11, wherein said user interface device is suitable for installation at a predetermined seat via the mounting system.

21. The user interface device of claim 20, wherein said user interface device is suitable for installation at an armrest of said predetermined seat.

22. The user interface device of claim 11, wherein said content presentation system includes a video presentation system.

23. The user interface device of claim 11, wherein said content presentation system includes an audio presentation system.

24. The user interface device of claim 11, wherein said content presentation system includes an input system for selecting viewing content for presentation.

25. The user interface device of claim 11, wherein said user interface device comprises a handheld device.

26. The user interface device of claim 11, wherein said selected viewing content is provided to said content presentation system from a content source.

27. The user interface device of claim 26, wherein said content source is external from said user interface device.

28. The user interface device of claim 26, wherein the selected viewing content is provided from the content source to said user interface device via a vehicle information system.

29. The user interface device of claim 11, further comprising a communication port disposed on a surface of the device housing for communicating with a communication cable assembly of a content source.

* * * * *